(12) United States Patent　　　　(10) Patent No.:　US 12,691,901 B2

Azimi et al.　　　　　　　　　　　　 (45) Date of Patent:　　　Jul. 28, 2026

(54) SYSTEM AND METHOD FOR SAFE PREDICTIVE CONTROL OF AUTONOMOUS VEHICLES

(71) Applicant: Gatik AI Inc., Mountain View, CA (US)

(72) Inventors: Vahid Azimi, Mountain View, CA (US); Apeksha Kumavat, Palo Alto, CA (US); Ehsan Sabouni, Mountain View, CA (US); Parsa Taleb, Mountain View, CA (US); Arjun Narang, Mountain View, CA (US); Gautam Narang, Palo Alto, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 19/340,391

(22) Filed: Sep. 25, 2025

(65) Prior Publication Data

US 2026/0084716 A1　　Mar. 26, 2026

Related U.S. Application Data

(60) Provisional application No. 63/796,171, filed on Apr. 28, 2025, provisional application No. 63/712,754, (Continued)

(51) Int. Cl.
| | |
|---|---|
| B60W 60/00 | (2020.01) |
| B60W 10/20 | (2006.01) |
| B60W 50/04 | (2006.01) |

(52) U.S. Cl.
CPC .......... B60W 60/001 (2020.02); B60W 10/20 (2013.01); B60W 50/045 (2013.01); (Continued)

(58) Field of Classification Search
CPC .. B60W 60/001; B60W 10/20; B60W 50/045; B60W 2556/40; B60W 2520/10; (Continued)

(56) References Cited

U.S. PATENT DOCUMENTS

| | | | |
|---|---|---|---|
| 11,919,514 B1 * | 3/2024 | Ravella | ............... B60W 60/001 |
| 2019/0025439 A1 | 1/2019 | Yilmaz et al. | |

(Continued)

FOREIGN PATENT DOCUMENTS

| | | | |
|---|---|---|---|
| CN | 111409641 B　* | 7/2023 | ...... B60W 30/18163 |
| WO | 2024039866 A1 | 2/2024 | |

OTHER PUBLICATIONS

Chance-Constrained Sequential Convex Programming for Robust Trajectory Optimization, Lew et al, IEEE 2020 (Year: 2020).*

(Continued)

*Primary Examiner* — Navid Z. Mehdizadeh
*Assistant Examiner* — Oliver Tan
(74) *Attorney, Agent, or Firm* — Jeffrey Schox; Diana Lin

(57)　　　　　　　　ABSTRACT

In variants, the system can include: a localization module; an objective generator; a mapping module; and a controller system including a set of Model Predictive Control (MPC) modules, a safety function generator, and a tire stiffness estimation module. The system can optionally include or be used with a Drive-by-Wire (DBW) system. The system functions to control an autonomous vehicle to track a planned trajectory. The system and/or components thereof are preferably located on a set of computing systems of an autonomous vehicle, but can additionally and/or alternatively be located elsewhere.

20 Claims, 15 Drawing Sheets

Related U.S. Application Data filed on Oct. 28, 2024, provisional application No. 63/699,631, filed on Sep. 26, 2024.

(52) U.S. Cl.
CPC ..... *B60W 2520/10* (2013.01); *B60W 2520/12* (2013.01); *B60W 2520/14* (2013.01); *B60W 2556/40* (2020.02); *B60W 2710/20* (2013.01)

(58) Field of Classification Search
CPC ......... B60W 2520/12; B60W 2520/14; B60W 2710/20
See application file for complete search history.

(56) References Cited

U.S. PATENT DOCUMENTS

| | | | |
|---|---|---|---|
| 2023/0202473 A1 | 6/2023 | Shalev-Shwartz et al. | |
| 2023/0406348 A1* | 12/2023 | Kabzan | G05D 1/0088 |
| 2025/0242817 A1* | 7/2025 | Desai | B60W 50/0097 |

OTHER PUBLICATIONS

High-Order Control Barrier Functions, Xiao et al, IEEE Jul. 2022 (Year: 2022).*

Determining the Optimal Coefficients of High-Order Error Feedback, Laakso et al, IEEE 1989 (Year: 1989).*

CN111409641B machine translation (Year: 2023).*

Lima, et al., "Spatial Model Predictive Control for Smooth and Accurate Steering of an Autonomous Truck", IEEE Transactions on Intelligent Vehicles, vol. 2, No. 4, pp. 238-250, Dec. 2017, doi: 10.1109/TIV.2017.2767279.

Ming, et al., "MPC-Based Trajectory Tracking Control for Intelligent Vehicles", SAE Technical Paper 2016-01-0452, 2016, https://doi.org/10.4271/2016-01-0452, Apr. 4, 2016.

Rawlings, et al., "Model Predictive Control: Theory, Computation, and Design", 2nd Edition, Nob Hill Publishing, Madison, Wisconsin, 2017.

Song, et al., "A Model Predictive Tracking Control Algorithm of Autonomous Truck Based on Object State Estimation Using Extended Kalman Filter", Journal of Drive and Control, vol. 16 No. 2 pp. 22-29, http://dx.doi.org/10.7839/ksfc.2019.16.2.022, Jun. 2019.

Song, et al., "Autonomous Wheel Loader Trajectory Tracking Control Using LPV-MPC", arXiv:2203.08944v2, https://doi.org/10.48550/arXiv.2203.08944, Mar. 16, 2022.

Xie, et al., "A model predictive control trajectory tracking lateral controller for autonomous vehicles combined with deep deterministic policy gradient", Transactions of the Institute of Measurement and Control 46(2) DOI:10.1177/01423312231197854, Oct. 2023.

Zeng, et al., "Safety-Critical Model Predictive Control with Discrete-Time Control Barrier Function", 2021 American Control Conference (ACC), New Orleans, LA, USA, 2021, pp. 3882-3889, doi: 10.23919/ACC50511.2021.9483029.

* cited by examiner set of sensors 10 measurements

Vehicle computing system 20 mapping module 400 environmental
representation objective generator
300 set of obstacle
detections error region
determination
module 610 time series of error regions
(e.g., polygons)

constraint generator
620 vehicle trajectories set of constraints set of MPC controllers
100 vehicle commands (e.g., throttle command,
brake command, steering command, etc.)

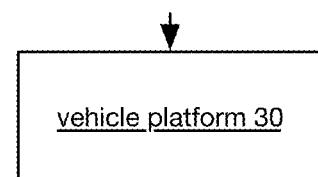

vehicle platform 30

S310 determining a set of error
values

S320 generating the error
region based on the error
values

Absolute heading angle error (eψ)

*at timestep N:*

*at timestep N+1:*

SYSTEM AND METHOD FOR SAFE PREDICTIVE CONTROL OF AUTONOMOUS VEHICLES

CROSS-REFERENCE TO RELATED APPLICATIONS

This application claims the benefit of U.S. Provisional Application No. 63/699,631, filed 26 Sep. 2024, U.S. Provisional Application No. 63/712,754, filed 28 Oct. 2024, and U.S. Provisional Application No. 63/796,171, filed 28 Apr. 2025, each of which is incorporated in its entirety by this reference.

TECHNICAL FIELD

This invention relates generally to the vehicle controls field, and more specifically to a new and useful control system and/or method in the vehicle controls field.

BRIEF DESCRIPTION OF THE FIGURES

FIG. 8 is a schematic representation of a second illustrative example of the method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
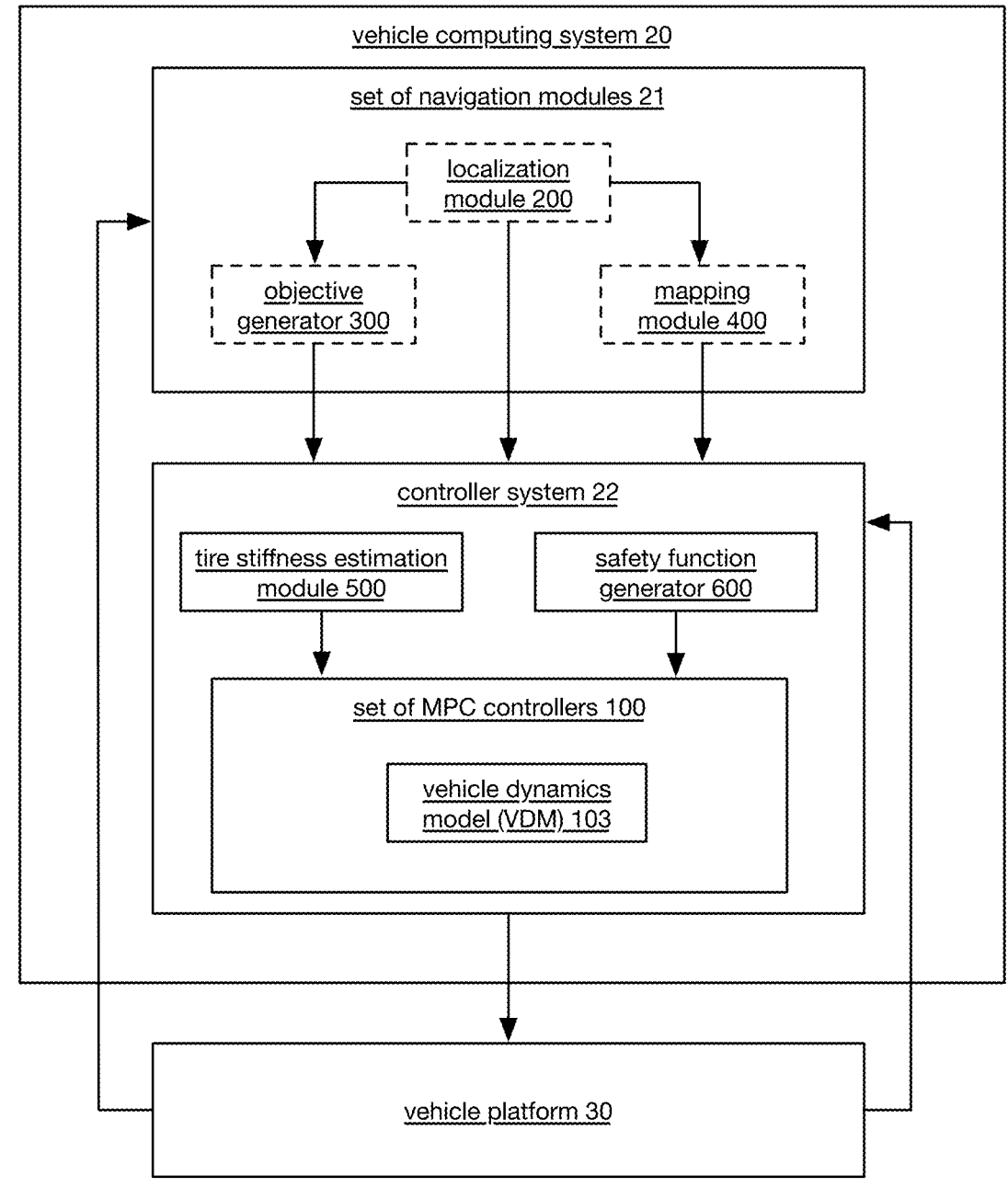
FIG. 1 is a schematic representation of a variant of the system.

The system, an example of which is shown in FIG. 1, can include: a localization module 200; an objective generator 300; a mapping module 400; a set of Model Predictive Control (MPC) controllers 100; and a safety function generator 600. The system can optionally include or be used with a tire stiffness estimation module 500; and a vehicle platform 30, a vehicle steering system 40, and a vehicle drive system 50. The system functions to control an autonomous vehicle to track a planned trajectory. The term "substantially" as utilized herein can mean: exactly, approximately, within a predetermined threshold or tolerance, and/or have any other suitable meaning. The system and/or components thereof can ingest and/or output any suitable parameters.

1.1 Illustrative Examples

Figure 11:
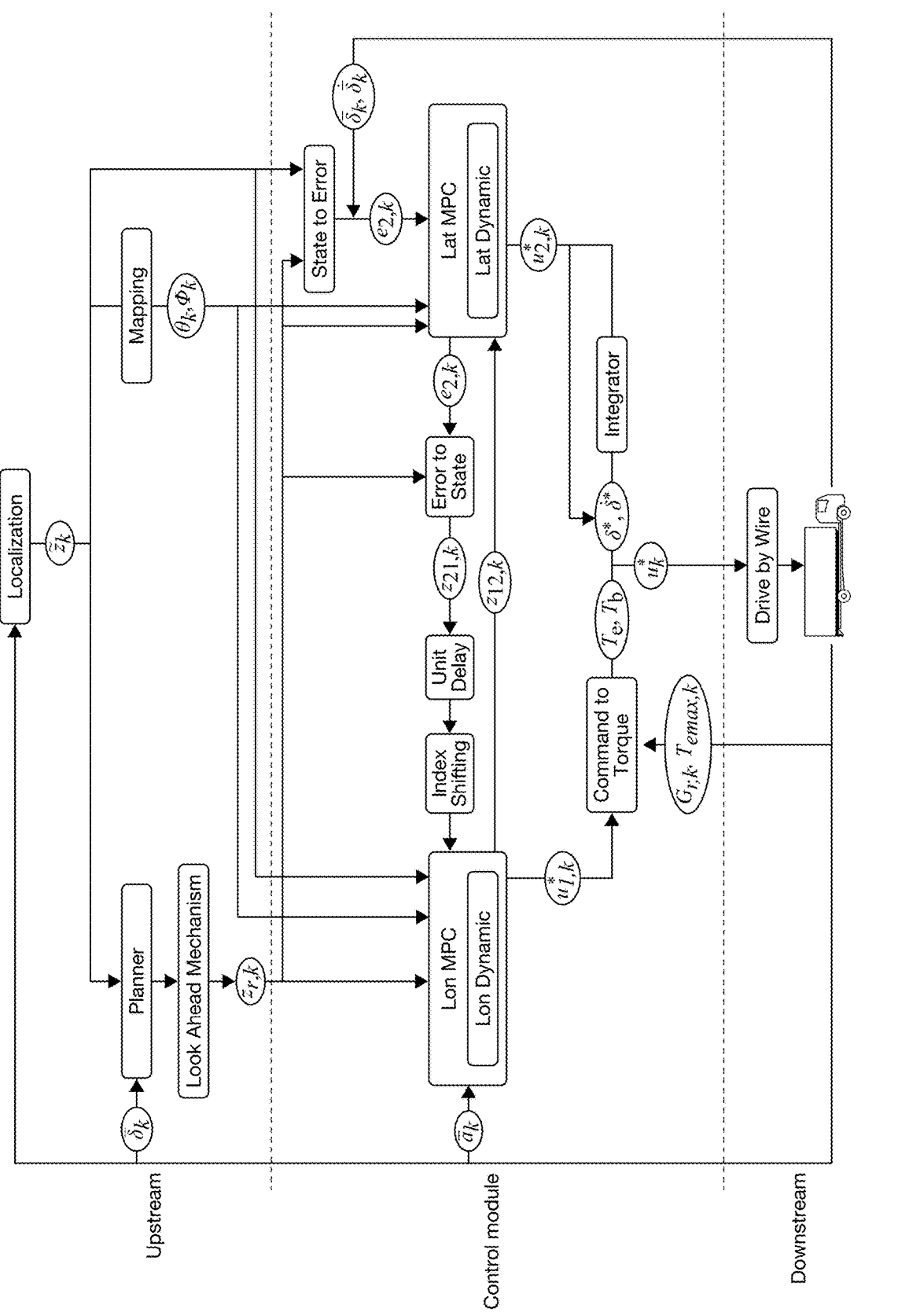
FIG. 11 is a schematic representation of a variant of the system.

In an illustrative example, variants of the system can include a pair of MPC controllers (e.g., a lateral MPC controller 101 and a longitudinal MPC controller 102, each leveraging a vehicle dynamics model 103), which determine steering commands independently but leverage shared signals from the opposite module to inform predictive control (e.g., example shown in FIG. 11, etc.). The MPC controllers can leverage information from a set of navigation modules 21, which can include a localization module (e.g., vehicle kinematics, etc.), an objective generator (e.g., a trajectory objective, etc.), and/or a mapping module (e.g., environmental parameters, etc.). The MPC controllers can additionally receive information from a tire stiffness estimation module (e.g., tire stiffness parameters, etc.) and/or any other suitable modules. Each MPC controller can determine a subset of overall vehicle command parameters (e.g., vehicle commands from the lateral MPC, such as: steering angle, steering rate, etc.; vehicle commands from the longitudinal MPC, such as: longitudinal acceleration, etc.) and apply relevant biases and/or constraints to the respective subset of overall vehicle control. In this illustrative example, when a new obstacle is detected in the scene, a set of constraints (e.g., a control barrier function) applied to the lateral MPC controller can be re-determined based on the identified obstacle. The set of constraints can be dynamically adjusted over time as more information is observed by the vehicle. The control barrier function can utilize a multi-ordered approach, whereby multiple orders (e.g., 4) of control barrier functions are determined and represent higher-order derivatives of constraints with respect to time.

Figures 13A, 13B:
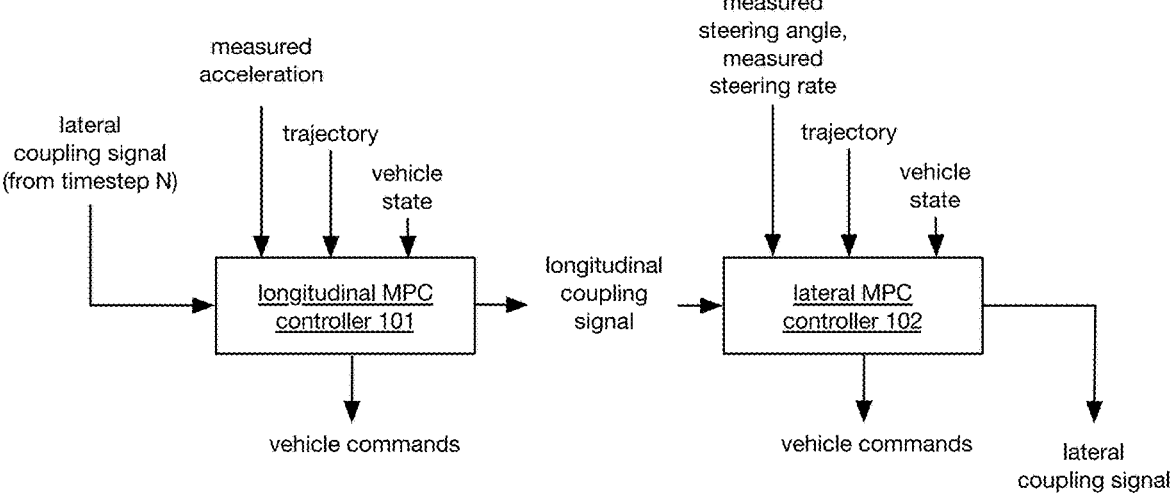
FIGS. 13A and 13B are a schematic representation of coupling signals at timesteps N and N+1.

In a specific example (e.g., as shown in FIG. 13A and FIG. 13B), at a first timestep, the longitudinal MPC controller can ingest a lateral coupling signal from a prior timestep, a measured acceleration from the first (e.g., current) timestep, a reference trajectory, and/or a measured vehicle state from the first timestep; and can output a longitudinal coupling signal and a set of vehicle commands (e.g., an acceleration command). At the first timestep, the lateral MPC controller can ingest the longitudinal coupling signal, a measured steering angle, measured steering rate, trajectory, vehicle state; and can output a lateral coupling signal and a set of vehicle commands (e.g., a steering rate, a steering angle, etc.).

In this specific example, at a second timestep, the longitudinal MPC controller can ingest the lateral coupling signal from the first (e.g., prior) timestep, a measured acceleration from the second (e.g., current) timestep, a reference trajectory, and/or a measured vehicle state; and can output a longitudinal coupling signal and a set of vehicle commands (e.g., an acceleration command).

However, the method can be otherwise performed.

2. Benefits

Variations of the technology can afford several benefits and/or advantages.

First, variants of the technology can reduce the error of trajectory tracking for autonomous vehicles by leveraging Model Predictive Control (MPC). In model predictive control, an optimization problem can be solved at each timestep, enabling the vehicle to handle complex constraints and dynamics in real time. Furthermore, MPC can predict future states of the system and adjust control inputs to minimize a cost function while satisfying constraints.

Second, variants of the technology can enable more efficient and accurate MPC solutions by splitting the MPC problem into separated longitudinal MPC and lateral MPC controllers. This splitting enables each MPC controller to solve more complex optimization problems (e.g., subject to dynamic constraints, etc.) specific to longitudinal and lateral motion, respectively. By sharing coupling signals between the longitudinal and lateral MPC controllers, each MPC can leverage more complete contextual information about vehicle kinematics while retaining the aforementioned benefits of using independent MPC controllers. Furthermore, by leveraging convex constraints on the MPC controller, the MPC can be solved as a linear optimization, which improves the computational efficiency of state prediction. Beyond computational efficiency, the decoupling approach offers multiple advantages in terms of design flexibility, system efficiency, independent execution frequency management, and modularity leading to easier testing, tuning, debugging, and validation.

Third, variants of the technology can leverage dynamic error constraints by implementing Control Barrier Functions (CBFs). Based on context (e.g., road attributes, obstacles in the way of the vehicle, etc.) and current state, the system can automatically adjust the bounds of acceptable error between the planned trajectory and actual trajectory. This can enable the vehicle to automatically adjust its wariness based on environmental context and can improve safety of autonomous vehicle operation. Furthermore, control barrier functions can provide forward invariant "safety sets" for autonomous vehicles, meaning that when the autonomous vehicle is operating within error bounds considered "safe," the vehicle will stay within the safety set for future timesteps within a planning horizon. By considering the rate at which the system approaches constraints, the CBFs anticipate and prevent sudden changes in control actions, making the autonomous vehicle trip smoother. In variants, the CBFs can be $1^{st}$, $2^{nd}$, $3^{rd}$, $4^{th}$, or $5^{th}$ order CBFs, leading to smoother control by considering higher derivatives of constraints. The splitting of MPC control into longitudinal and lateral elements enables the usage of CBFs by simplifying constraint calculations necessary (e.g., error region determination, etc.) to make dynamic CBFs possible.

Fourth, variants of the technology can enable finer tuning of different MPC controllers of the system. For example, in variants each MPC can operate at different frequencies, which may be useful for implementations in which aspects of one MPC may be more computationally-costly than those of another MPC, or in implementations in which the accuracy of controls in one dimension (e.g., the lateral dimension) are more safety-critical than controls in other dimensions (e.g., the longitudinal dimension.

Fifth, variants of the technology provide a second layer of safety redundancy beyond safety considerations used for trajectory planning. Since controller performance can be imperfect, thereby causing tracking errors, the CBF constraints can compensate for angular and/or absolute tracking errors. This dual-layer approach in variants of the system can improve overall system safety by keeping the vehicle within a kinematic operating envelope during vehicle operation.

However, variations of the technology can additionally or alternately provide any other suitable benefits and/or advantages.

3. System

The system, an example of which is shown in FIG. 1, can include: a localization module 200; an objective generator 300; a mapping module 400; and a controller system 22 including a set of Model Predictive Control (MPC) modules 100, a safety function generator 600, and a tire stiffness estimation module 500. The system can optionally include or be used with a vehicle platform 30 (e.g., a drive-by-wire system). The system functions to control an autonomous vehicle to track a planned trajectory. The system and/or components thereof are preferably located on a set of computing systems of an autonomous vehicle, but can additionally and/or alternatively be located elsewhere.

Figure 6:
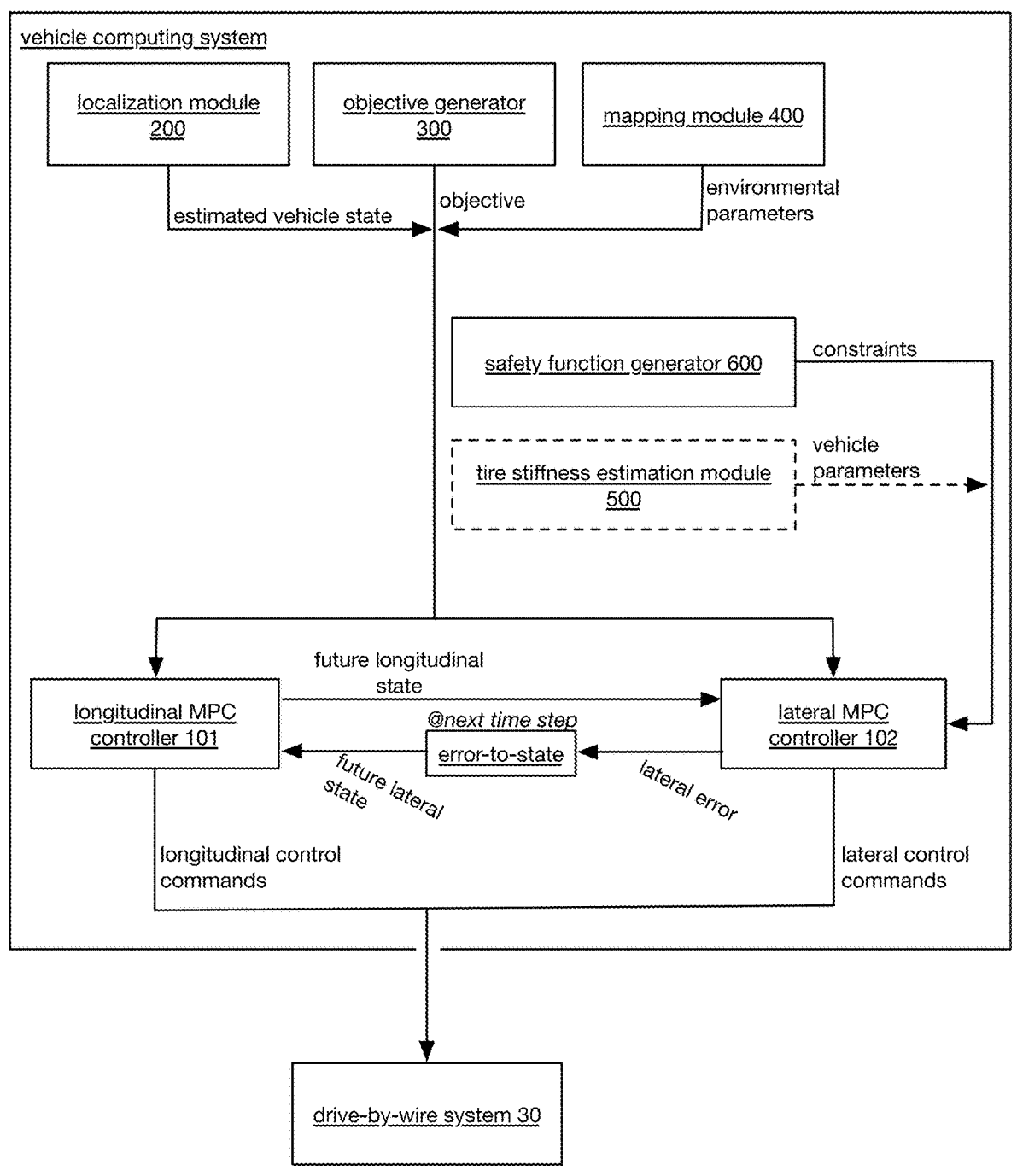
FIG. 6 is a schematic representation of a variant of the system during vehicle control.

In variants, the system is preferably executed by and/or integrated into a vehicle computing system (e.g., example shown in FIG. 6), which can include the localization module, objective generator, mapping module, the set of MPC controllers (e.g., a longitudinal MPC controller and a lateral MPC controller, etc.), the safety function generator, and the tire stiffness estimation module, and/or any other suitable modules/elements. Additionally, the computing system can include or be integrated with the vehicle platform 30. However, the system can include any other suitable components.

In variants, the system can include modules (e.g., MPCs, navigation modules, etc.) that operate substantially independently, at individual frequencies. The modules which use outputs of other modules can use the most recently-determined values (e.g., from a current timestep or a prior timestep, etc.). The modules can alternatively operate synchronously and/or according to any other operational pattern.

The system can implement any of the aforementioned modules using local and/or remote computing resources. The vehicle computing system can include one or more: CPUs, GPUs, custom FPGA/ASICS, microprocessors, servers, cloud computing, and/or any other computing components. The computing system can be local, remote, distributed, and/or otherwise arranged relative to any other system or module(s).

The modules of the system can perform their respective functions in real time (e.g., responsive to a request), iteratively, concurrently, asynchronously, periodically, and/or at any other suitable time. The modules of the system can perform their respective functions automatically, manually, semi-automatically, and/or otherwise performed.

The system can include embodiments with combinations and permutations of various system components and module processes. One or more instances of the module processes can be performed asynchronously (e.g., sequentially), contemporaneously (e.g., concurrently, in parallel, etc.), or in any other order by and/or using one or more instances of the systems, elements, and/or entities. Components and/or processes of the system and/or method can be used with, in addition to, in lieu of, or otherwise integrated with all or a portion of the systems and/or methods disclosed in the applications mentioned above.

The localization module 200 functions to determine a vehicle state estimate. Additionally, the localization module can perform S100 and/or any other suitable processes. The localization module is preferably implemented by the vehicle computing system, but can alternatively be implemented by another suitable system component.

The localization module preferably determines the estimated vehicle state. The localization module can estimate vehicle state in multiple ways. In a first variant, the vehicle state can be an observed state from measurements. In an example of this variant, the input to the localization module can be the wheel odometry from rotary encoders attached to the truck wheels. In a second variant, the estimated vehicle state can be a modeled state (e.g., using a bicycle model of the vehicle, etc.). In an example of the second variant, the modeled state can be determined by learning a mismatch between a predicted state and an actual state, then using a mismatch prediction model to augment a modeled state using a predicted mismatch. In a third variant, the estimated vehicle state can be a future state from previous timestep or method iteration (e.g., inferred or predicted by linear regression between update cycles). The estimated vehicle state can additionally and/or alternatively be determined through any other method. The estimated vehicle state can include vehicle kinematics (e.g., position, velocity, acceleration, jerk, rotation, angular velocity, angular acceleration, angular jerk in any suitable dimension, etc.). The estimated vehicle state can include components of error (e.g., divergence from an objective). In an example, the error can refer to divergence from an objective path (e.g., a trajectory). The error can include lateral position error, rate of change of lateral position error, heading error, rate of change of heading error, steering angle error, rate of change of steering angle error, and/or any other error parameters. The estimated vehicle state can be in one reference frame (e.g., heading angle, etc.), a vehicle reference frame (e.g., yaw angle, etc.), and/or any other suitable reference frame. The estimated vehicle state can be absolute and/or can represent a change in kinematics from a previous timestep.

The localization module preferably estimates vehicle state based on a set of sensor measurements (e.g., visual measurements, IMU measurements, etc.), a set of prior observed kinematic information, a set of prior planned states, and/or any other suitable information, but can additionally and/or alternatively determine estimated vehicle state based on other inputs.

In variants, the localization module can model multiple different vehicle components, each with different associated kinematic parameters.

However, the localization module 200 may be otherwise configured.

The objective generator 300 (e.g., equivalently referred to as a "planner" or "planning module"; example shown in FIG. 11) functions to determine a set of objectives for the autonomous vehicle. The objective generator objectives preferably include a vehicle trajectory, but can additionally or alternatively include other suitable objectives (e.g., target speed, error tolerance, etc.). In an example, an objective can be an "error state" (e.g., a difference between a current state (e.g., estimated state, etc.) and a vehicle trajectory. In this example, estimated state can be converted into an error state, which is input into an MPC controller (e.g., the lateral MPC controller, etc.).

The objective generator preferably generates a vehicle trajectory which represents a planned path for the autonomous vehicle to take. The vehicle trajectory can be relative to an existing planned trajectory (e.g., from a prior timestep) or relative to the current location of the vehicle (e.g., determined by the localization module). The vehicle trajectory can include suitable attributes of a vehicle motion plan, including position, rotation (and/or first and second derivatives thereof, etc.), and/or any other attributes.

Additionally, the objective generator can generate vehicle trajectory attributes that can change over a future set of timesteps (e.g., over a planning horizon), but can alternatively generate vehicle trajectory attributes that do not change over a future set of timesteps. The planning horizon ($N_P$) can be 2 seconds, 4 seconds, 6 seconds, 8 seconds, 10 seconds, 15 seconds, can be within an open or closed range bounded by the aforementioned values, and/or can be any other suitable planning horizon. The planning horizon can have the same or different length as the control horizon. The objective generator can perform trajectory generation based on a determined route of the vehicle, based on a received trajectory, based on a decided action of the vehicle, based on a set of predetermined operation parameters (e.g., max speed, max jerk, etc.), and/or any other suitable input information, but can additionally and/or alternatively be otherwise configured. In variants, the objective generator can additionally/alternatively perform obstacle detection and avoidance. In an example, when the objective generator detects an obstacle, the safety function generator generates a new set of error regions based on attributes of the obstacle (e.g., position, shape, size, etc.).

In variants, the objective generator can leverage an action model (e.g., determining a vehicle action, etc.), a trajectory model (e.g., determining a vehicle trajectory, etc.), and/or any other suitable models. The models can be trained models, non-trained models, and/or any other suitable type of model. The models can be specific to a current context, specific to an action type, and/or otherwise specific or non-specific.

However, the objective generator 300 may be otherwise configured.

The mapping module 400 functions to determine environmental parameters and optionally an environmental representation (e.g., a virtual model) of the environment around the vehicle. The mapping module preferably uses sensor information to determine environmental parameters, but can alternatively and/or additionally use information extracted from a map (e.g., based on the vehicle location), context-specific information, and/or any other environmental information. In an example, the mapping module fuses sensor information into an environmental representation which can include road boundaries, obstacles, and/or any other suitable information. In this example, the environmental parameters can be extracted and/or otherwise determined from the environmental representation.

The environmental parameters determined by the mapping module can include an angle of inclination ($\theta$), a road banking angle ($\varphi$), aerodynamic drag forces ($F_{aero}$), rolling resistance ($R_x$), road friction coefficients, temperature, road texture, road curvature, road width, superelevation and/or other suitable environmental parameters. In an example, the mapping module determines an angle of inclination of the road (e.g., an angle of inclination of the road beneath the vehicle, etc.) and a road banking angle and passes each of the two parameters to the set of MPC controllers.

The mapping module can additionally perform detecting an obstacle S200 based on measurements of the environment. In an example, when a new obstacle is detected in the environment, S300 and S400 are triggered to update the control barrier function (CBF) constraining state prediction performed by a lateral MPC.

In variants, the mapping module can additionally or alternatively determine an environmental representation which can include: representations of obstacles (e.g., semantic classification, location, dimensions, etc.), a road representation, and/or other suitable information or parameters.

However, the mapping module 400 may be otherwise configured.

The controller system 22 functions to determine vehicle controls (e.g., vehicle commands, vehicle component commands, etc.) based on an objective (e.g., a trajectory). In variants, the controller system can include a tire stiffness estimation module, a safety function generator, a set of MPC controllers, and/or any other suitable components.

Figure 3:
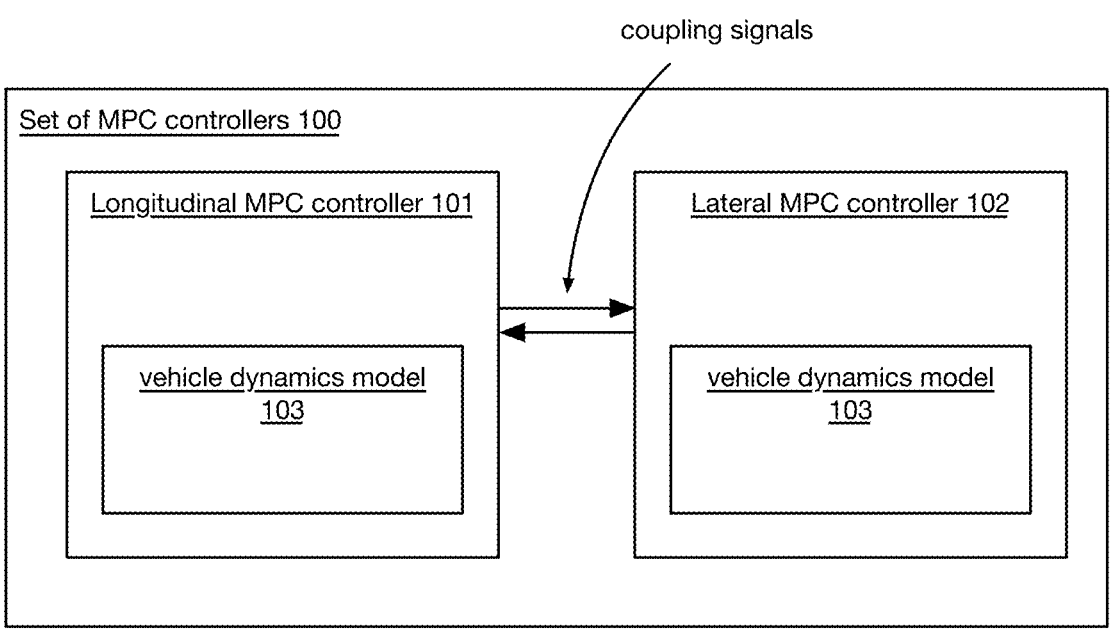
FIG. 3 is a schematic representation of a variant of the set of MPC controllers.

The set of Model Predictive Control (MPC) modules function to determine vehicle commands (e.g., control instructions for vehicle components; etc.). Additionally, the MPC controllers can perform S500 and/or other method process(es). In a variant, the set of MPC controllers can include two MPC controllers (e.g., a longitudinal MPC controller and a lateral MPC controller, etc.; example shown in FIG. 3) which can each determine vehicle commands and/or future states of the vehicle along a module-specific axis (e.g., wherein each module-specific axis represents an independent degree of freedom, etc.). In an example of this variant, the MPC controllers can exchange information via coupling signals. Alternatively, one or more of the MPC controllers can be decoupled and/or independent of each other (e.g., within a given time frame or iterative timestep), serially dependent, and/or otherwise suitably configured.

The MPC controllers of the set of MPC controllers can individually and/or collectively solve an optimization problem (e.g., subject to a set of constraints) at each time step in order to predict vehicle commands and future states of the system and/or determine vehicle commands therefrom. The inputs to the set of MPC controllers can include modeled (e.g., future) and/or observed (e.g., estimated) vehicle state, estimated error, a set of objectives, constraints, and optionally: a set of environmental parameters, weights, coupling signals, and/or any other suitable information. The set of MPC controllers can output: a future vehicle state (e.g., rotational and/or translational parameters; to be used as a coupling signal), kinematic control parameters (e.g., steering rate, acceleration, velocity, jerk, etc.), vehicle commands (e.g., motor torque, brake torque, steering angle, road wheel angle, and/or rates of change thereof, etc.), and/or any other suitable information.

Each MPC controller can leverage a vehicle dynamics model 103 (VDM; e.g., a bicycle model, a point mass model, four-wheel model, a rigid body model, etc.) which can use estimated and/or observed parameters to model and/or predict vehicle kinematic behavior (e.g., to determine a future vehicle state, etc.). In an example, an MPC controller uses a portion of a bicycle model relating to a module-specific control axis of the vehicle. The vehicle dynamics model 103 can use an estimated tire cornering stiffness (e.g., determined by the tire stiffness estimation module, etc.), an estimated center of gravity, a known wheelbase, a known vehicle mass and/or moment, and/or any other suitable parameters.

In a first variant, the system can include a set of Model Predictive Control (MPC) modules (e.g., a longitudinal MPC controller 101 and a lateral MPC controller 102), which each predict vehicle states in a particular dimension. In an example, the two MPC controllers can each independently determine vehicle commands as well as longitudinal and lateral future states of the vehicle, respectively, and can optionally exchange information via coupling signals. Examples of coupling signals can include a rate of change of yaw, a longitudinal velocity, and/or any other suitable kinematic variables or combination of kinematic variables.

The MPC controllers can include interaction between modules (e.g., in order to account for interrelated vehicle kinematics between the lateral and longitudinal MPCs, etc.). For example, accelerating or braking can affect lateral dynamics (e.g., cornering ability, stability, etc.) of the vehicle. Conversely, changes in steering angles can influence the vehicle's speed and acceleration profiles. In variants, the modules (e.g., MPC controllers) exchange coupling signals that can represent how kinematics in one control axis impact kinematics in the other; in variants, this well-defined interaction can prevent suboptimal performance or instability of the entire control system. In an example, the longitudinal MPC provides the vehicle speed to the lateral MPC to adjust the steering strategy. For example, the longitudinal MPC controller can receive a future lateral state (e.g., lateral yaw rate and lateral velocity planned at a current or previous timestep, etc.) and the lateral MPC controller can receive a future longitudinal state (e.g., longitudinal velocity planned at a current or previous timestep, etc.).

In a second variant, the system can include a single MPC controller predicting both longitudinal and lateral future states and/or vehicle commands.

The MPC controllers can output a set of future states (e.g., kinematics; to use as coupling signals), vehicle commands, (e.g., such as steering commands, acceleration commands, a torque command, etc.) and/or any other information.

The MPC controllers preferably use linear model predictive control (LMPC), but can additionally or alternatively include nonlinear MPC, pure pursuit controllers, PID controllers, sliding mode control, backstepping controllers, and/or other suitable methods for vehicle commands determination. In examples, the MPC controllers utilize optimal control theory-based solutions to determine future states and/or vehicle commands.

The Model Predictive Control controllers can use an Operator Splitting Quadratic Program (OSQP) solver, a quadratic programing Online Active Set Strategy (qpOASES), and/or any other suitable solver(s) or techniques.

In variants, the MPC controllers can include a longitudinal MPC and a lateral MPC.

Figure 5A:
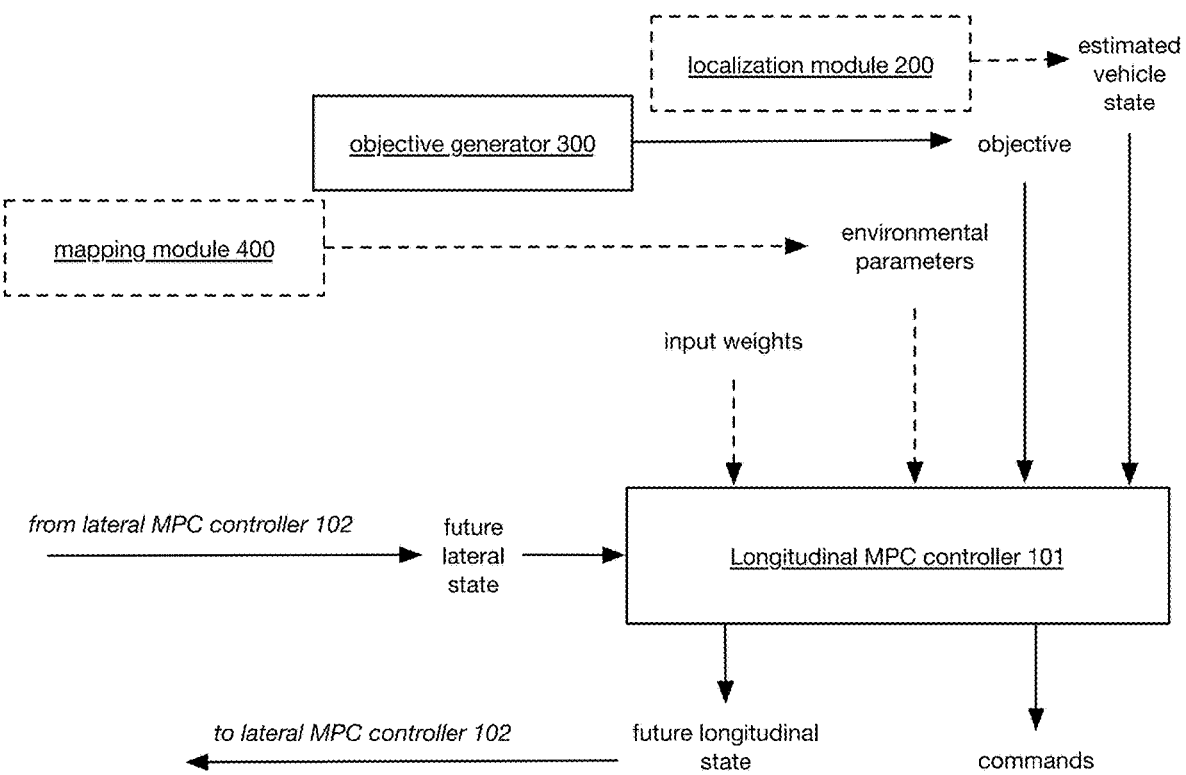
FIGS. 5A and 5B are a schematic representation of variants of the longitudinal MPC and lateral MPC, respectively, during vehicle control.

The longitudinal MPC (e.g., example shown in FIG. 5A) can ingest modeled and/or observed vehicle state (e.g., kinematics determined by a localization module), a set of objectives (e.g., determined by an objective generator), optionally a set of environmental parameters (e.g., determined by the mapping module), and optionally a set of control weights (e.g., positive definite matrices corresponding to states and control input weights, etc.), and/or any other suitable parameters. In variants, the longitudinal MPC can additionally use coupling signals generated by the lateral MPC. Examples of coupling signals used by the longitudinal MPC can include a future lateral state from the lateral MPC, a lateral state determined from a lateral error value, a prior control signal (e.g., longitudinal acceleration, etc.), and/or any other suitable information.

The longitudinal MPC can output future (e.g., planned) states of the vehicle in the longitudinal direction (e.g., to use as coupling signals) and/or commands (e.g., a longitudinal acceleration command optionally determined from the future states or but preferably determined separately from the future states, etc.) determined therefrom.

The longitudinal MPC is preferably not subject to the constraints determined by the safety function generator, but can additionally and/or alternatively be subject to other constraints or can be unconstrained.

However, the longitudinal MPC may be otherwise configured.

The lateral MPC can include a safety function generator and/or a tire stiffness estimation module.

Figure 5B:
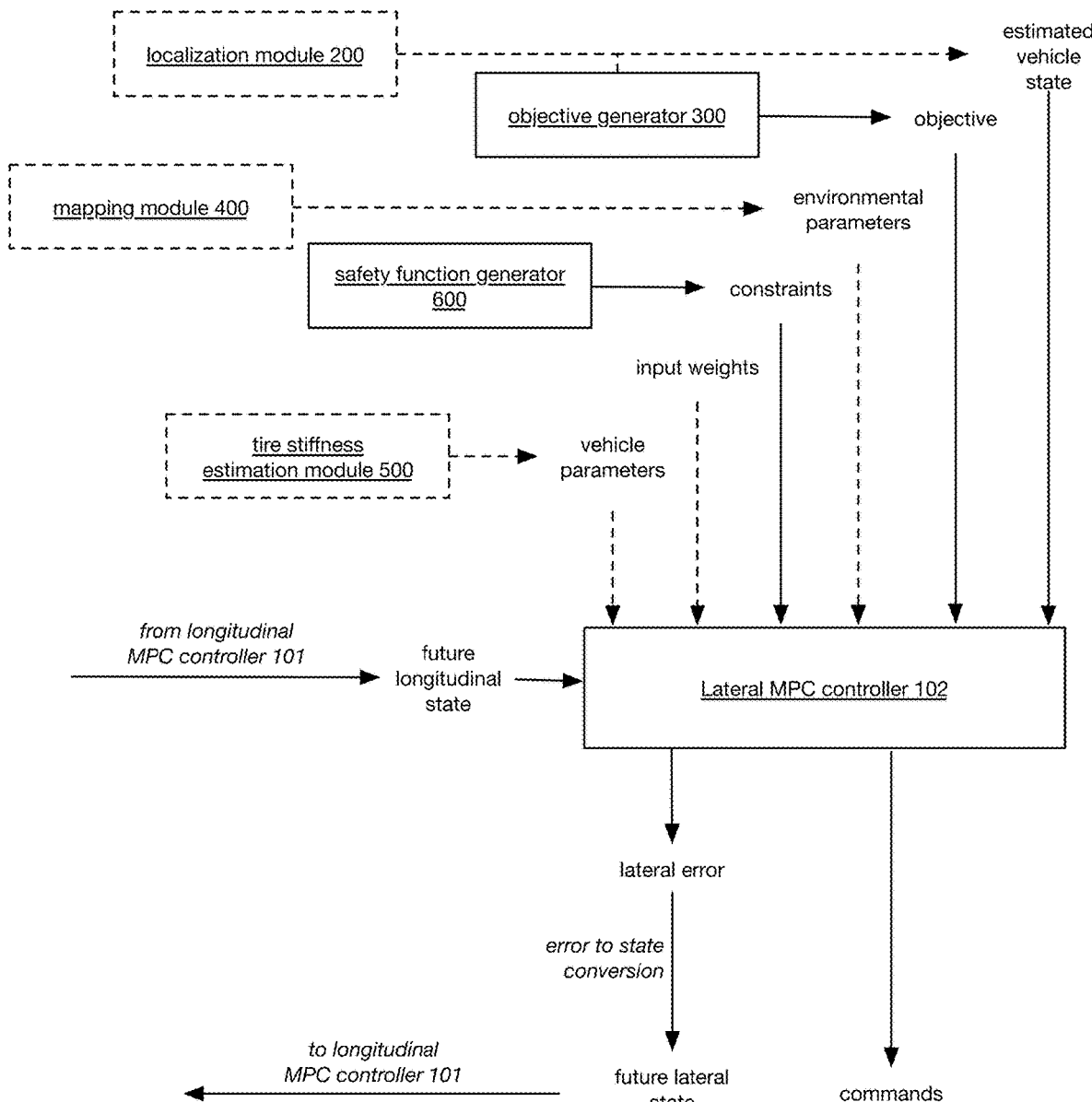

The lateral MPC (e.g., example shown in FIG. 5B) can ingest modeled and/or estimated vehicle state (e.g., determined by a localization module), a set of objectives (e.g., determined by an objective generator), a set of environmental parameters (e.g., determined by the mapping module), control weights (e.g., positive definite matrices corresponding to states and control input weights, etc.), constraints (e.g., control barrier functions determined by the safety function generator, etc.), vehicle parameters (e.g., tire stiffness determined by the tire stiffness estimation module, etc.), and/or any other suitable parameters.

The lateral MPC can incorporate a most recent parameterized control barrier function (CBF) determined by the safety function generator into the optimization directly, such that the optimization is subject to the CBF. The CBF can be dynamically-updated upon receipt from the safety function generator, but can alternatively not be dynamically-updated. The control barrier function can be based on a convex safety set in order to apply the CBF to a linear MPC.

The lateral MPC can additionally use future longitudinal state from the longitudinal MPC (e.g., coupling signals generated from a current timestep or previous timestep, etc.).

The lateral MPC controller can output future lateral error, commands such as steering rate and steering angle, future lateral states (e.g., rotational and translational states and/or velocities, etc.; to use as coupling signals, etc.), and/or any other outputs (e.g., determined from the ingested information, etc.).

However, the lateral MPC 102 may be otherwise configured.

However, the model predictive control (MPC) controllers 100 may be otherwise configured.

Figure 4:
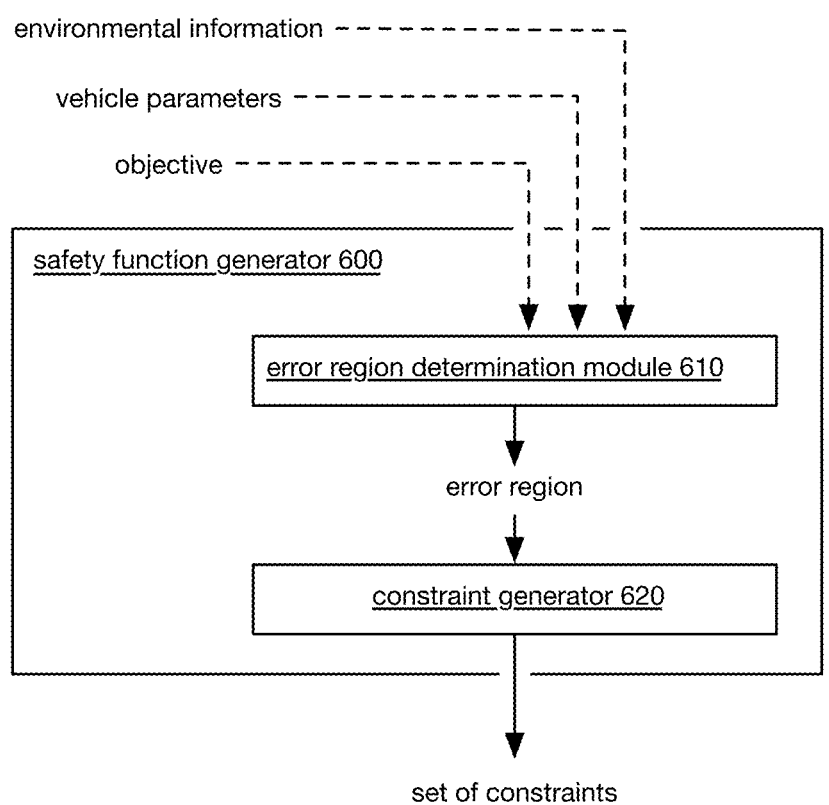
FIG. 4 is a schematic representation of a variant of the safety function generator during vehicle control.

The safety function generator 600 (e.g., example shown in FIG. 4) functions to generate a control barrier function for use by the model predictive control controller (e.g., a lateral MPC). The safety function generator can include and/or implement a control barrier function that can constrain the determined output state or trajectory determined by the MPC. The safety function generator can include an error region determination module 610 (e.g., which, in an example, can determine a convex polygon within a multi-dimensional error space) and/or a constraint generator 620 (e.g., which, in an example, can determine a set of control barrier functions based on the convex polygon).

The safety function generator can determine a control barrier function based on a set of error regions in an error space constraining the margin of control error (e.g., to within a notionally 'safe' set of errors).

Figure 7:
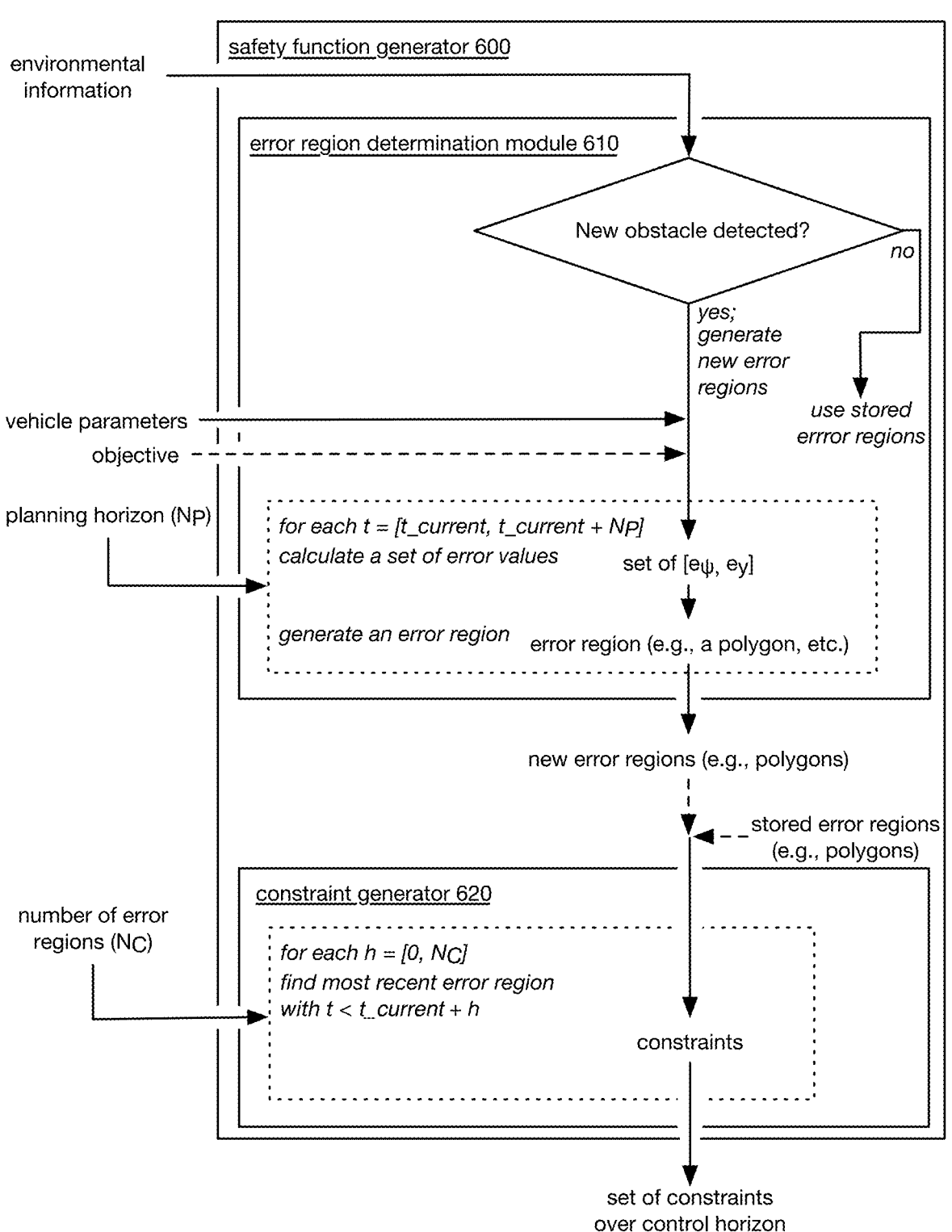
FIG. 7 is a schematic representation of a variant of the safety function generator during vehicle control.

In variants, the safety function generator includes an error region determination module and a constraint generator (e.g., example shown in FIG. 7). The error region determination module functions to determine the safety set as represented by regions in error space. The error region determination module can perform S300 and/or substeps thereof (e.g., S310) as triggered by detection of a new obstacle in the scene (e.g., S200), and/or can perform any other suitable processes. In an example, when the new obstacle is detected, and a timestep associated with the new obstacle is determined (e.g., a timestep at which the vehicle will reach the new obstacle, etc.), the error region determination module generates control barrier functions corresponding to the new obstacle and associates the control barrier functions with the timestep, such that over time, as new control barrier functions are added, a time series of control barrier function sets is determined.

For the error region determination module, error can refer to the translational distance and/or angular differences between an objective (e.g., a planned path) and a current or future (e.g., planned) state of the vehicle. The error is preferably path-relative (and/or trajectory relative), but can alternatively not be path-relative. In an example, error can include heading error ($e_\psi$) and/or lateral error ($e_y$). The error can additionally or alternatively include velocity error, heading rate error, and/or any other error types. In variants, the error space can be an N-dimensional space defined by different types of error (e.g., translation-based error, rotation-based error, time-based error, etc.) on different axes. In an example, the error space can be a two-dimensional space defined by heading error on a first axis and translational error on a second axis. However, the error space can be otherwise defined.

The error region determination module 610 can perform calculation of a set of lateral error values as a function of heading error, and generation of error regions from a set of error regions fit to the set of lateral error values and heading error values (e.g., such as described in step S300).

The error region determination module can perform event-triggered computations in which a safety set is characterized using an error region, as described in S300. In a variant, the error region determination module can output an error region in error space (e.g., an error-based kinematic operating envelope within which to operate the vehicle, etc.).

However, the error region determination module 610 may be otherwise configured.

The constraint generator 620 functions to turn an error region determined by in step S300 into a set of constraints for the MPC controller(s). The constraint generator can transform edge-based state constraints into Control Barrier Function (CBF) constraints (e.g., to address recursive feasibility issues inherent in the MPC with state constraints and facilitate forward invariance).

The constraint generator can perform S400 (e.g., calculation of a set of constraints based on the error regions), and/or additionally and/or alternatively perform any other suitable processes. In a variant, the constraint generator can ingest a number of error regions ($N_C$), a set of error regions, a set of vehicle parameters (e.g., a vehicle bounding box size), path boundary information (e.g., from the mapping module), and a set of environmental information.

In a variant, the constraint generator can output constraints including a sequence of functions and/or a set of safety sets (e.g., from the error region determination module, etc.). In an example, the set of safety sets can include a number of auxiliary safety sets (e.g., 3 auxiliary safety sets, etc.) representing operating envelopes for different orders of vehicle control (e.g., constraints on velocity, acceleration, and jerk, respectively, etc.). In a specific example, first order CBF constraints can constrain vehicle position; second order constraints can constrain the rate at which the vehicle approaches first order CBF constraints; third order constraints can constrain the rate at which the vehicle approaches second order CBF constraints, and/or any other order constraints.

However, the constraint generator 620 may be otherwise configured.

However, the safety function generator 600 may be otherwise configured.

The optional tire stiffness estimation module 500 functions to estimate tire cornering stiffness for use by the MPC controllers. The tire stiffness estimation module can include estimating different tire stiffness parameters for the front and rear tires (e.g., $C_{\alpha f}$ and $C_{\alpha r}$, respectively). The tire stiffness estimation module can estimate tire stiffness dynamically (e.g., online estimation, adaptive parameter estimation, predictive modelling, etc.) or can use a predetermined tire stiffness. In an example, the tire stiffness estimation module can use a Kalman filter (e.g., a Hybrid Extended Kalman Filter, etc.) to estimate cornering stiffness by fusing the localization module with sensor measurements over time. In this example, the HEKF can estimate these parameters while filtering out measurement noise.

In variants, the tire stiffness estimation module can enable the vehicle to actively adjust to changing tire parameters in real time without direct measurements from the tire through the usage of dynamically-determined tire stiffness.

The tire stiffness can calculate tire stiffness parameters as a part of a planning loop (e.g., at the planning frequency, etc.), as a part of a control loop (e.g., at the control frequency, etc.), and/or as part of any other suitable process at any other suitable frequency.

However, the tire stiffness estimation module 500 may be otherwise configured.

However, the controller system 22 can be otherwise configured.

The vehicle platform 30 functions to implement commands received from the MPC controller and/or the vehicle control system. The vehicle platform and/or components thereof can perform S600 and/or any other suitable processes. The vehicle platform can be communicatively connected to include a vehicle steering system 40 (e.g., steering actuators, such as an electric power steering gearbox, etc.), a vehicle drive system 50 (e.g., drive actuators, such as an engine, a set of brakes, etc.), a set of electronic control units (ECUs) that receive control signals from the set of MPC controllers (e.g., and facilitate transmission to other subcomponents, etc.). The vehicle platform can be located onboard the vehicle and can communicatively connect to different vehicle subsystems (e.g., the braking subsystem, vehicle computing system, steering subsystem, etc.). In a first variant, the vehicle platform can directly implement commands received from the MPC. In a second variant, the vehicle platform can augment and/or transform data received from the MPC.

In an example, the vehicle platform and/or components communicatively coupled to the vehicle platform (e.g., subcontrollers specific to vehicle components, etc.) can calculate engine torque ($T_e$) and/or brake torque ($T_b$) from vehicle commands using vehicle mass, tire radius, tire stiffness values, transmission efficiency, gear ratios, and/or other suitable information.

In variants, the vehicle platform 30 can additionally include a safety monitoring layer that validates control instructions against safety parameters (e.g., defined by the error regions, control barrier functions, and/or any other suitable safety parameters). In a variant, the vehicle platform can be, include, and/or interface with any of the systems and/or subsystems described in U.S. application Ser. No. 18/082,173, filed 15 Dec. 2022, which is incorporated herein in its entirety by this reference.

However, the vehicle platform 30 may be otherwise configured.

The vehicle steering system 40 functions to implement lateral vehicle commands. The vehicle steering system can include steering actuators (e.g., electric power steering motor, hydraulic steering system, etc.), steering linkages, and/or any other components for controlling vehicle lateral motion. The vehicle steering system can receive commands from the lateral MPC controller (e.g., steering angle commands, steering rate commands, etc.) via the vehicle platform 30 and implement these commands through the steering actuators. In an example, the vehicle steering system implements both steering angle and steering rate commands to achieve the desired lateral trajectory while respecting the CBF constraints. The vehicle steering system can operate at the control frequency of the lateral MPC controller or at a different frequency.

However, the vehicle steering system 40 can be otherwise configured.

The vehicle drive system 50 functions to implement longitudinal vehicle commands. The vehicle drive system (e.g., powertrain, etc.) can include an engine (e.g., electric motor, internal combustion engine, hybrid powertrain, etc.), a transmission system, a braking system (e.g., friction brakes, regenerative braking, etc.), and/or any other components for controlling vehicle longitudinal motion. The vehicle drive system can receive commands from the longitudinal MPC controller (e.g., acceleration commands, torque commands, etc.) and implement these commands through the appropriate actuators. In an example, the vehicle drive system converts longitudinal acceleration commands into throttle positions and/or brake pressures. The vehicle drive system can operate at the control frequency of the longitudinal MPC controller or at a different frequency.

However, the vehicle drive system 50 can be otherwise configured.

However, the system can include any other suitable components.

4. Method

Figure 2:
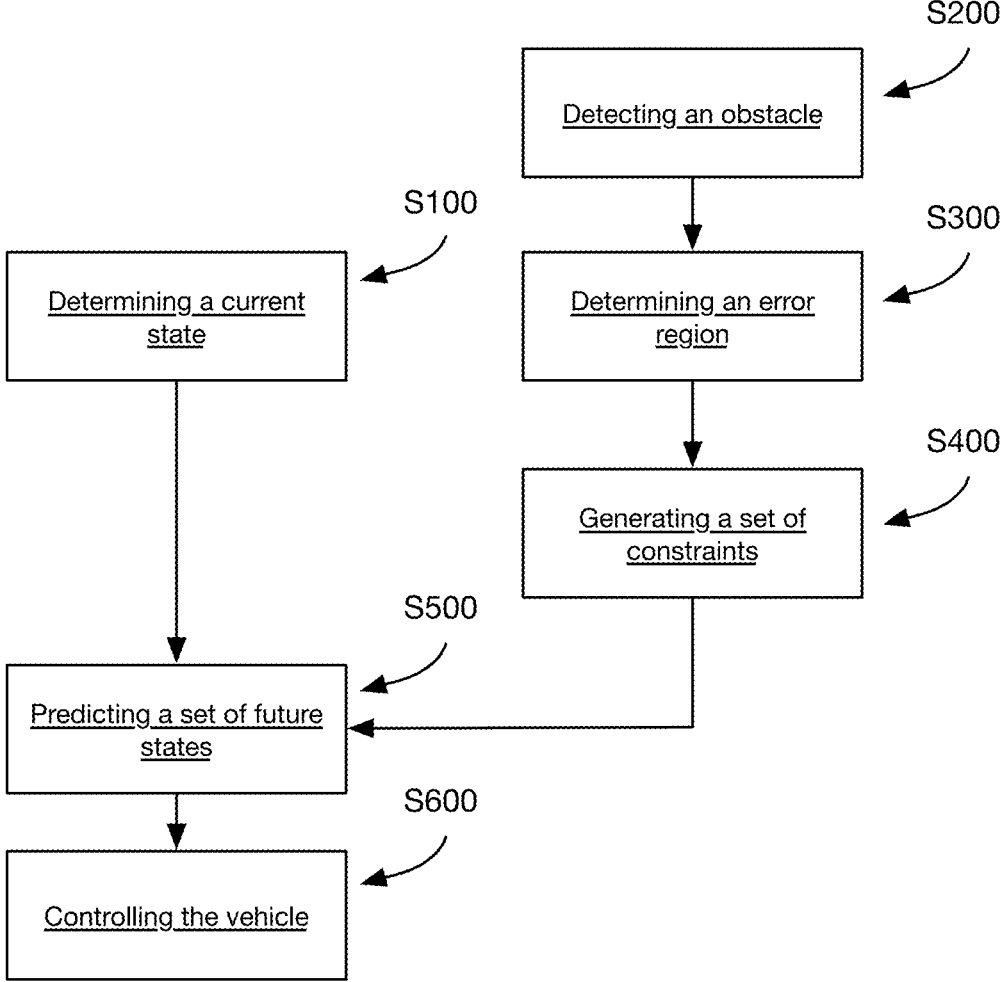
FIG. 2 is a schematic representation of a variant of the method.

As shown in FIG. 2, the method can include: determining a current state S100; detecting an obstacle S200; determining an error region S300; generating a set of constraints S400; predicting a future state S500; and controlling the vehicle S600. However, the method can include any other suitable element(s). The method functions to control an autonomous vehicle to safely track a planned trajectory.

Determining a current state S100 functions to determine a set of vehicle kinematics (e.g., an estimated vehicle state) relating to the vehicle. S100 is preferably performed by the localization module using methods described therein, but can additionally and/or alternatively be performed by any other component. S100 is preferably performed at a regular timestep (e.g., periodically, etc.), but can additionally and/or alternatively be performed at any other timestep. In a variant, S100 can use any of the methods and/or processes described in U.S. patent application Ser. No. 17/116,810, filed 9 Dec. 2020, incorporated herein in its entirety by this reference.

However, determining a current state S100 may be otherwise performed.

Detecting an obstacle S200 functions to trigger redetermination of a set of constraints for vehicle state prediction. Obstacles can alternatively be referred to as "objects" herein. Examples of obstacles can include other agents in the scene (e.g., vehicles, pedestrians, animals, bicyclists, etc.), road features (e.g., lane boundaries, lane lines, stop signs, etc.), physical objects within the scene (e.g., litter, bollards, curbs, road debris), and/or any other suitable type of obstacle. S200 is preferably performed by the objective generator (e.g., a planner), but can additionally and/or alternatively be performed by the mapping module and/or any other system component. In a first variant, S200 can be performed based on a set of measurements of the scene directly. In a second variant, S200 can be performed based on an environmental representation of the scene constructed based on the set of measurements (e.g., a 3D model representing road features, obstacles, and other agents in the scene, etc.). However, S200 can be performed based on any other suitable information.

S200 can include evaluating the measurements and/or environmental representation for a trigger of S300 and/or S400. Conditions for triggering S300 and/or S400 can include: detection of a new agent (e.g., a pedestrian, another vehicle, etc.) in the scene; detection of a curvature of the road exceeding a threshold; detection of a road width changing; detection of a construction zone can be detected; detection of a road surface condition changing (e.g., from dry to wet, etc.); and/or any other conditions. In variants, S200 can include detecting new information about a previously-detected obstacle for which prior measurements are non-existent or unclear; or detecting that obstacle information of a previously-detected have changed (e.g., for example, a confidence associated with a position obstacle has changed due to sudden obstacle motion; a heading of the obstacle has changed, etc.). In such variants, updates to obstacle information of the obstacle can trigger S300 and/or s400. Examples of such parameters can include: obstacle kinematics (e.g., position, velocity, acceleration, jerk, etc.), estimated obstacle intent (e.g., whether a car is likely to turn into the vehicle's lane, etc.), obstacle semantic class (e.g., child, dog, adult, bollard, curb, etc.), obstacle dimensions (e.g., width, height, weight, etc.), and/or any other suitable obstacle information and/or a confidence associated with any of the aforementioned types of obstacle information. In examples, S200 can include relaying the obstacle information to S300.

However, detecting an obstacle S200 may be otherwise performed.

Determining an error region S300 functions to determine a set of error bounds within a 2D space. The 2D space is preferably heading error ($e_\psi$) vs lateral error ($e_y$), but can additionally and/or alternatively be otherwise defined. The error region is preferably a polygon, but can alternatively be an ellipse, a set of lines, a rounded polygon, and/or any other suitable shape. In variants in which the error region is a polygon, the error region can be rectangular or non-rectangular. The error region is preferably convex, but can alternatively be concave and/or can have any other suitable geometric configuration.

S300 is preferably performed by the error region determination module, but can additionally and/or alternatively be performed by any other module.

In variants, S300 can be triggered by a trigger condition (e.g., during vehicle operation, etc.). Examples of trigger conditions can include detection of an obstacle (e.g., in S200), determination of new information about a detected obstacle (e.g., a change in position, an obstacle classification, etc.), and/or any other suitable trigger condition. Examples of trigger conditions can include: road curvature exceeding a predetermined threshold, detection of changes in road width, detection of a construction zone, detection of a changes in road surface conditions (e.g., from dry to wet, etc.), detection of changes in vehicle mass affecting dynamics, updates to path boundary information from upstream modules, and/or other suitable trigger conditions.

The trigger condition can be associated with an obstacle timestep and the error region determined in S300 can be associated with the obstacle timestep. The obstacle timestep is preferably a (predicted) future timestep (e.g., a timestep in a control horizon) but can alternatively be a current timestep. The obstacle timestep can be a timestep at which the vehicle reaches the obstacle, a timestep at which the vehicle comes within a threshold distance of the obstacle, a timestep at which the vehicle is closest to the obstacle, and/or any other suitable timestep.

In trigger-based variants of S300, a plurality of error regions can be associated with a time series in a control horizon (e.g., in which each error region is associated with a different obstacle timestep, etc.).

In variants, S300 can include storing determined error regions with their associated temporal information. In an example, each error region can be stored as a temporal association pair comprising the error region and its corresponding obstacle timestep. The stored temporal associations can be maintained in a data structure (e.g., a set, database, memory structure, etc.) for subsequent retrieval during vehicle control operations. The temporal associations enable the system to select appropriate error regions based on timing relationships during real-time vehicle control. In variants in which the timesteps of the planning horizon are longer than the control horizon, the error regions determined over the planning horizon provide a reservoir of pre-computed error regions and/or safety constraints determined therefrom that can be selected and applied during higher-frequency control operations.

In an example of this variant, error regions and/or constraints are determined when an obstacle is detected, S300 further includes establishing a correspondence between the determined error region and/or control functions and an obstacle timestep. In this example, different error regions and/or constraints can be determined for different timesteps. In another example, non-exclusive with the previous example, multiple error regions and/or constraints can be determined for the same obstacle (e.g., whereby when more information is collected about the obstacle, an error region and/or constraint is updated with respect to geometry and/or obstacle timestep, etc.).

S300 preferably includes determining error regions for only a subset of timesteps in the control and/or planning horizon (e.g., only timesteps which are obstacle timesteps, etc.), but can alternatively include determining error regions for all timesteps in a control and/or planning horizon. In variants in which the time series of error regions is sparse, S500 can include using the temporally-nearest error region for a given timestep for future state prediction over a control horizon. In such variants, the effective error region for a timestep may be identical to an error region of a proximal timestep in the time series.

Figure 10:
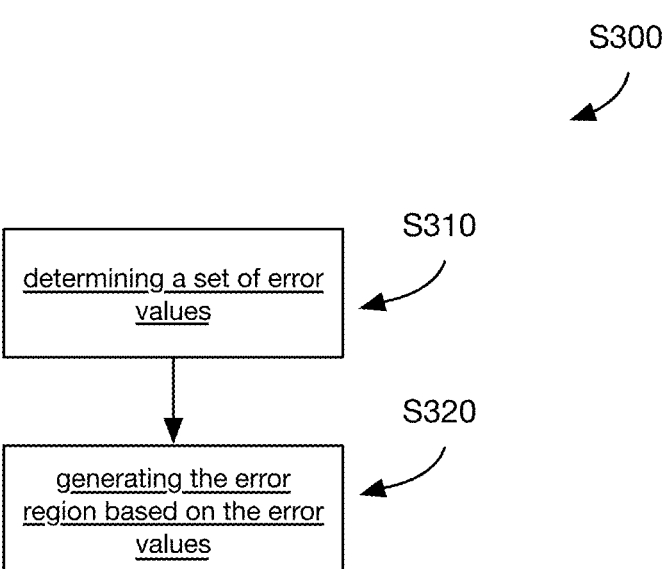
FIG. 10 is a schematic representation of determining an error region.

In variants, S300 can include determining a set of error values S310 and determining an error region based on the error values S320 (e.g., example shown in FIG. 10).

Determining a set of error values S310 functions to define a basis for error region construction. The error values are preferably a set of values in a multi-dimensional error space (e.g., a 2D error space) but can alternatively be values in a single dimension. The error space can have 1, 2, 3, 4, 5, 6, and/or any other suitable number of dimensions. Examples of axes of the error space can include: lateral error, heading error, velocity error, heading rate error, steering angle error, rate of change of steering angle error, longitudinal position error, and/or any other suitable error parameters.

In a variant, S310 can include discretizing one or more axes in the error space into a set of intervals (e.g., equally-spaced intervals, unequally-spaced intervals, etc.). In this example, the quantity of intervals can be predetermined, determined based on a range of possible error values, dynamically determined, and/or otherwise determined. In a specific example, the discretized axis is a heading error axis.

In variants in which at least one axes are discretized, S310 can include calculating maximum allowable error values for points at the intervals of the discretized axes (e.g., at equally-spaced points along the axes). The maximum allowable error value preferably refers to a type of error distinct from the discretized axis/es but can alternatively be another suitable type of error. In a specific example, S310 can include determining a set of maximum allowable lateral error values for each of a range of equally spaced heading error values.

Figure 12A:
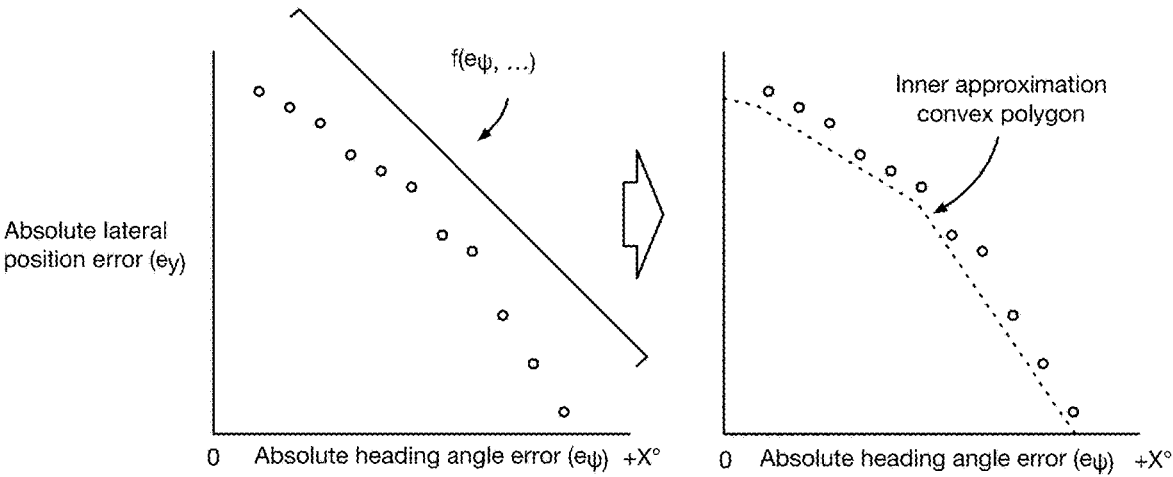
FIGS. 12A, 12B, and 12C are illustrative examples of determining an error region.
Figure 12B:
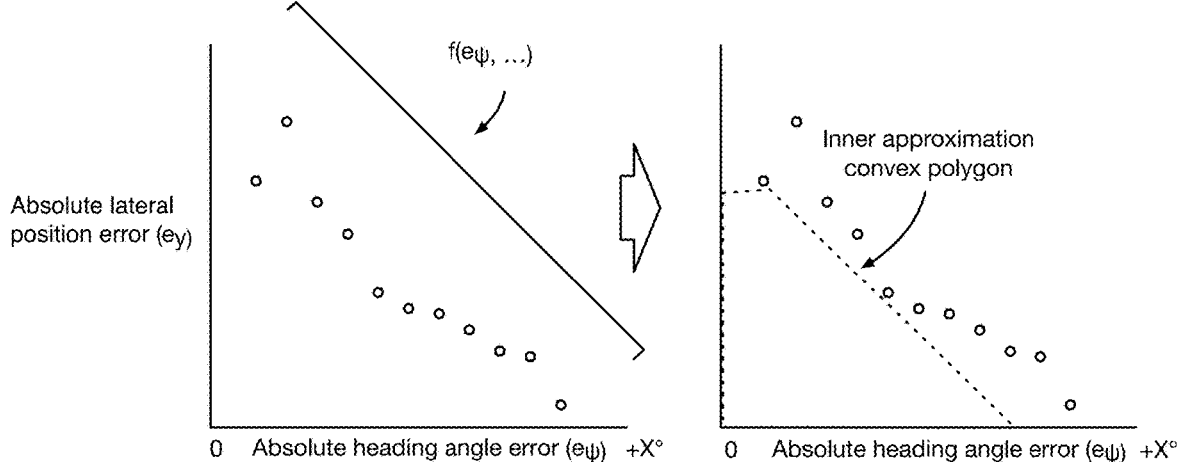
Figure 12C:
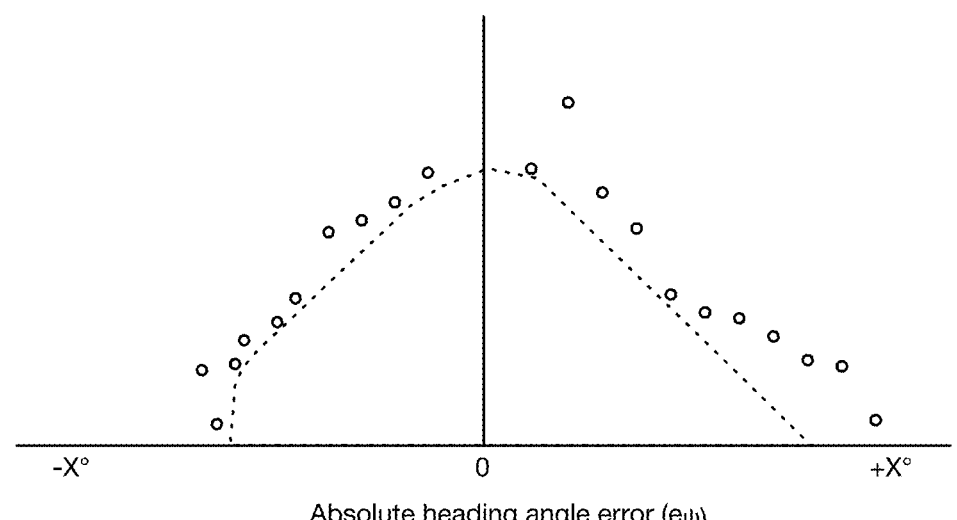

Error values can be determined based on path boundaries, trajectory curvature, vehicle dimensions (e.g., vehicle wheelbase, front axle to center of gravity distance, rear axle to center of gravity distance, vehicle width, a vehicle bounding box and/or components thereof, vehicle mass, a moment of inertia, etc.), vehicle kinematics (e.g., vehicle position, velocity, acceleration, yaw rate, etc.), obstacle classification, vehicle dynamics constraints (e.g., maximum steering angle, maximum lateral acceleration, tire friction limits, etc.), obstacle dimensions, obstacle kinematics, safety margin requirements (e.g., minimum clearance distances, time-to-collision thresholds, regulatory minimum separation distances, etc.), regulatory constraints, and/or any other suitable factors affecting vehicle safety regions (e.g., defined by error values and used to calculate the kinematic operating envelope, etc.). In an example, error values can be based on obstacle information determined in S200. In variants, the error values can be symmetric about zero error or asymmetric about zero error (e.g., to account for factors such as road banking, uneven obstacle distributions, and/or directional constraints imposed by traffic patterns or road geometry; example shown in FIG. 12C). In an example, two heading error values (e.g., −1 and 1) with the same absolute value correspond to different maximum allowable error values, and/or any other error value relationships. Error values can be absolute values, but can alternatively be non-absolute values.

However, S310 can be otherwise performed.

Generating the error region based on the error values S320 functions to define a region in error space in which the vehicle can safely operate. S320 can include using an inner approximation of the error values, an outer approximation of the error values, a best fit approximation (e.g., least squares polygon, etc.), boundary tracing, parametric shape fitting, and/or any other suitable method. In a specific example, S320 can include fitting an inner approximation error region (e.g., a polygon) to the set of heading error/lateral error values (e.g., example shown in FIG. 12A and FIG. 12B, etc.). In an example, for complex, non-convex safety regions defined by the set of error values, the error region can be the largest convex polygon that fits within the non-convex safety region defined by error values computed by the error region determination module. In a second example, for such a non-convex safety region, the error region can be a simplified convex hull that encompasses critical vertices of the non-convex region while excluding concave portions that would complicate the optimization problem. In a third example, the error region can be determined by decomposing the non-convex safety region into multiple convex sub-regions and selecting the largest or most restrictive sub-region. However, the error region can be calculated using other suitable methods.

The error region can be regular, but can alternatively be irregular. The error region can be symmetrical about the 0 heading/lateral error axes, but can alternatively not be symmetrical about the 0 heading/lateral error axes. In variants in which the error region is a polygon, the error region can have a predetermined number of sides, but can alternatively have a dynamically-determined number of sides.

In variants, S320 can include parameterizing the resulting error region (e.g., polygon) using mathematical representations suitable for constraint generation. In an example, the polygon can be parameterized using half-space constraints, where the coefficients define the polygon edges and constraint boundaries for subsequent optimization problems.

In variants, the polygonal complexity of the error region (e.g., number of sides, etc.) can be predetermined or variable (e.g., determined based on environmental complexity, computational constraints, and accuracy requirements). In examples, simple scenarios may result in quadrilateral error regions, while complex multi-obstacle environments may require polygons with additional vertices to accurately represent the error region.

However, S320 can be otherwise performed.

However, determining an error region S300 may be otherwise performed.

Generating a set of constraints S400 functions to convert the error regions determined in S300 into a set of constraints for the MPC controller (e.g., a control barrier function). S400 can be performed multiple times over the course of a single vehicle trip, but can alternatively not be performed multiple times over the course of a single vehicle trip. S400 is preferably performed responsive to the determination of a new error region in S300 but can alternatively be performed at any other suitable time. S400 is preferably performed for each error region associated with obstacle timesteps within a control horizon but can alternatively be performed for a subset or combination of error regions associated with obstacle timesteps within a control horizon. In a specific example, S400 can include parameterizing each edge of the error region (e.g., forming half-space constraints) and constructing 4th-order CBF constraints.

The error region used for a constraint at a given timestep can be a temporally-closest error region with an associated obstacle timestep before the given timestep, a most restrictive (e.g., conservative) error region over the control horizon, an error region associated with a median level of risk of obstacles in the control horizon, an aggregation of error regions (e.g., a sum of edges of all polygons, a set of blended constraints, etc.) over the control horizon, and/or any other suitable error region, set of error region, or combination thereof.

In a first variant, S400 can include using constraints generated at previous iterations of S400 (e.g., constraints generated based on previously-detected obstacles, etc.). In this variant, S400 can add new constraints based on newly-detected obstacles to a preexisting set of constraints, or can select from a stored, pre-computed set of constraints based on proximity to control timesteps within the control horizon. For example, an error region associated with a planning timestep can be selected for use in a control timestep that occurs nearest to the planning timestep, enabling the system to bridge between planning-frequency constraint generation and control-frequency constraint application. The selection process can include identifying the most recently computed error region that applies to each control timestep, interpolating between multiple error regions when control timesteps fall between planning timesteps, and/or using any other suitable temporal mapping approach. In a first example of this variant, the existing constraints do not change when constraints for a newly-detected obstacle are added (e.g., the newly-detected obstacle does not require more conservative behavior from the vehicle). In a second example of this variant, the overall constraints partially or wholly change based on the newly-detected obstacle requiring more conservative behavior.

In a second variant, constraints can be changed or replaced at an iteration of S400. In an example, when new information is determined about previously-detected obstacles (e.g., the associated obstacle has moved, has become more dangerous, has been identified and associated with a semantic class, etc.), existing constraints based on the previously-detected obstacle can be replaced with new constraints based on a new error region determined for the previously-detected obstacle.

However, constraints can otherwise change or not change between iterations of S400.

In an example, the first, second, third, and fourth-order CBF constraints can function as nested safety nets with increasing conservatism, allowing for smooth transitions between control actions as the vehicle approaches constraint boundaries.

However, generating a set of constraints S400 may be otherwise performed.

Predicting a set of future states S500 functions to determine a future state of the vehicle (e.g., to use as a coupling signal) and a set of vehicle commands (e.g., to control the vehicle). In variants, a future state can be a kinematic state (e.g., a position, speed, acceleration, jerk, yaw, yaw rate, etc.), a kinematic error (e.g., optionally converted to kinematic state by an error-to-state algorithm, etc.). Vehicle commands can include the aforementioned kinematic states, a set of direct vehicle commands (e.g., an engine torque, a brake torque, a steering angle, a steering rate, etc.), and/or any other suitable information. The set of future states and/or the vehicle commands can include a single future state and/or vehicle commands (e.g., a kinematic state at a single current or next timestep, etc.) or a time series of future states (e.g., over a control horizon) and/or vehicle commands. The control horizon can be 0.5 seconds, 1 second, 2 seconds, 3 seconds, 5 seconds, 6 seconds, 10 seconds, can be within an open or closed range bounded by the aforementioned values, and/or any other suitable control horizon. The control horizon is preferably less than the planning horizon but can alternatively be greater than the planning horizon. In variants in which the control horizon comprises a set of discrete timesteps, the timesteps are preferably shorter than timesteps of the planning horizon but can alternatively be longer than timesteps of the planning horizon. The control horizon is preferably the same for the lateral and longitudinal MPC controllers but can alternatively be different between the lateral and longitudinal MPC controllers.

S500 is preferably performed by a pair of model predictive control controllers (e.g., longitudinal MPC controller and lateral MPC controller, etc.), but can additionally and/or alternatively be performed by other suitable system components. The longitudinal MPC controller and lateral MPC controller can perform S500 in parallel or in series. In a first variant, during an iteration of the method, the longitudinal MPC controller can determine a set of vehicle commands (e.g., kinematic parameters such as acceleration) as well as longitudinal future state and pass the determined longitudinal future state to the lateral MPC controller as a first coupling signal. In this variant, the lateral MPC controller can determine a set of vehicle commands and a lateral future state using the first coupling signal, and can pass the lateral future state to the longitudinal MPC controller as a second coupling signal. In a second variant, during an iteration of the method, the lateral MPC controller can determine a set of vehicle commands and a lateral future state and pass the determined vehicle commands and lateral future state to the longitudinal MPC controller as a first coupling signal. In this variant, the longitudinal MPC controller can determine the vehicle commands and the longitudinal future state using the first coupling signal and can pass the longitudinal future state to the lateral MPC controller as a second coupling signal. The coupling signals can be kinematic states of the vehicle, kinematic state error, and/or any other suitable form of coupling signal.

In variants, the longitudinal and lateral MPC controllers can perform S500 at the same frequency or different frequencies from each other. Examples of frequencies at which the longitudinal and lateral MPC can perform S500 can include 5 Hz, 10 Hz, 20 Hz, 30 Hz, 50 Hz, 75 Hz, 100 Hz, 150 Hz, a frequency within an open or closed range bounded by the aforementioned values, and/or any other suitable frequency. In variants, the frequency at which an MPC controller operates can be the same or different as execution frequencies of the objective generator, localization module, and/or mapping module. In a specific example, in a planning cycle, the objective generator generates an objective (e.g., a path, etc.) at a first frequency (e.g., 10 Hz), and in a control cycle, the MPC controllers (e.g., the lateral and/or longitudinal MPC controllers) perform S500 at a second frequency higher than the first (e.g., 50 Hz). The second frequency can be 1× higher (e.g., the same frequency) than the first frequency, 2× higher, 3× higher, 5× higher, 10× higher, 50× higher, a multiple within an open or closed range bounded by the aforementioned values, and/or any other suitable frequency.

In a variant, S500 can include formulating future state/ vehicle command determination as separate linear model predictive control (LMPC) problems, one for each degree of freedom or subset of degrees of freedom of the vehicle. In an example of this variant, two MPC controllers executing separate LMPC problems can be used. In this example, one or both MPC controllers can use an integrated control barrier function (CBF) to transform state constraints (e.g., a "safety set", etc.) into CBF constraints for use by an MPC controller. In this example, the MPC controllers can be a joint MPC-CBF controller.

S500 can include identifying a most recently-determined set of constraints (e.g., determined when a trigger condition for performing S300 and S400 was most recently satisfied) and using the identified set of constraints. S500 can additionally and/or alternatively include performing S300 and/or S400 in real-time. S500 is preferably performed at a higher frequency than S400, but can alternatively be performed at the same frequency as S400. In an example, each MPC can optionally take a subset of the constraints (e.g., a subset over the span of the control horizon, etc.) determined over the planning horizon.

In variants, S500 can include using the set of constraints (e.g., determined in S400, etc.) or not using constraints. In an example, one MPC controller (e.g., the lateral MPC controller, longitudinal MPC controller, etc.) uses the set of constraints, and the other MPC controller (e.g., the longitudinal MPC controller, lateral MPC controller, etc.) does not use the set of constraints. In another example, both MPC controllers use constraints, but only one MPC controller (e.g., the lateral MPC controller) uses the control barrier functions determined in S400. In variants in which constraints are used, the MPC controller preferably uses constraints from multiple time steps in the time series, such that the predicted future states over the control horizon satisfy future constraints as well as current ones (e.g., in examples where the constraints become more conservative at a future timestep for an approaching obstacle, etc.). Alternatively, only constraints at a single timestep are used. However, the constraints can otherwise be used or not used.

However, predicting a future state S500 may be otherwise performed.

Figure 9:
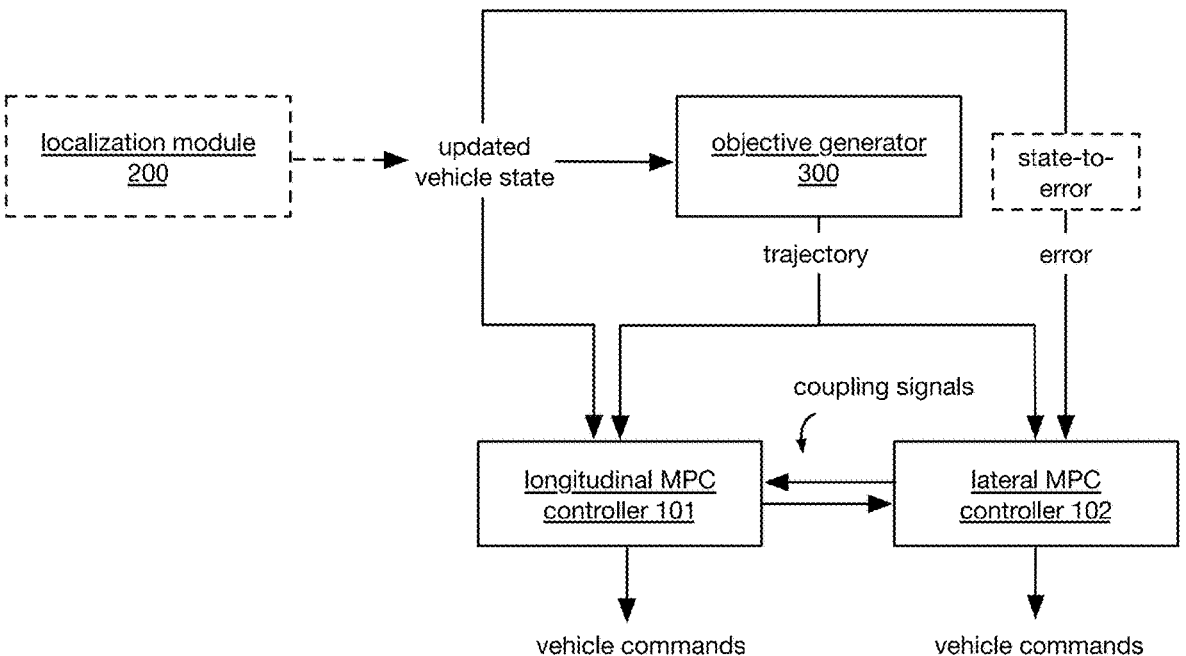
FIG. 9 is a schematic representation of a first illustrative example of the method, indicating information flow across multiple timesteps.

Controlling the vehicle S600 functions to implement a set of vehicle commands. The vehicle commands can be implemented directly (e.g., in variants where vehicle component commands are output directly from the MPC controllers), can be converted into vehicle component commands before implementation (e.g., by transforming a vehicle command such as translational or rotational acceleration into vehicle component command; such as a throttle torque command, or braking torque command, etc.; example shown in FIG. 9), and/or used in any other suitable processes. The set of vehicle commands can be the future state (e.g., in variants where an MPC outputs direct controls, etc.), can be determined based on the future state (e.g., in variants where an MPC outputs kinematic states, such as acceleration, jerk, snap, crackle, etc.), and/or can be otherwise related to the future state.

In variants in which S500 includes determining a time series of future states (e.g., over a control horizon, etc.), either the whole time series can be used in S600 (e.g., used for determining vehicle commands for each timestep in the control horizon, etc.) or a subset of the time series can be used in S600 (e.g., timesteps corresponding to a first subset of the control horizon, etc.). In a specific example, only the first future state in the time series is used to determine a vehicle command.

In variants, S600 can include converting the vehicle commands into vehicle component commands. In such variants, converting vehicle commands into vehicle component commands can include converting longitudinal acceleration commands into engine torques, brake torques, throttle controls, motor speeds, and/or other vehicle commands using vehicle parameters including mass, tire radius, transmission efficiency, gear ratios, and maximum torque limits; converting lateral MPC controller outputs (e.g., angular rotation commands, lateral translation commands, etc.), into steering column component commands such as steering angle commands, steering rate commands, steering motor torque commands, electric power steering system commands, hydraulic steering pressure commands, and/or other steering actuator control signals using vehicle parameters including steering gear ratios, steering system dynamics parameters, motor specifications, and actuator response characteristics; and/or transforming error-space lateral outputs into absolute state values for integration with longitudinal control coupling signals. In examples of such variants, conversion of vehicle commands into vehicle component commands can be performed within each MPC controller or downstream of each MPC controller (e.g., as a post-processing step).

In a first example, a longitudinal acceleration prediction is converted into a torque command (e.g., to achieve the predicted acceleration, etc.). In a second example, a lateral acceleration prediction and/or yaw rate prediction can be converted into a steering angle control command or steering torque control command (e.g., to achieve the predicted values, etc.).

S600 is preferably performed responsive to S500 (e.g., in real-time), but can additionally and/or alternatively be performed at any other time. S600 is preferably performed by the drive-by-wire system, but can additionally and/or alternatively be performed by the vehicle computing system and/or any suitable subcomponent thereof. In variants, S600 can include executing the vehicle commands.

S600 can include controlling a steering system (e.g., an electric and/or hydraulic power steering actuator, etc.), a drive system (e.g., including a set of brakes, a fuel injector, an engine, a transmission, etc.), and/or any suitable vehicle components. In an example, S600 includes sending a command to an ECU of any of the aforementioned systems and executing the command at the ECU. In examples, S600 can include actuating any of the aforementioned vehicle components (e.g., applying the brakes, opening a throttle valve, applying a steering torque at a steering gearbox, etc.). In examples, the lateral MPC controller can determine vehicle commands for the steering system, and the longitudinal MPC control can be used to determine vehicle commands for the drive system. In a specific example, vehicle commands from each MPC can be non-overlapping (e.g., where each MPC facilitates vehicle command determination for one of the longitudinal and lateral MPC). In this specific examples, the constraints or a subset thereof (e.g., CBF constraints, etc.) can be used to determine vehicle commands for only one of the vehicle drive system or vehicle steering system (e.g., the lateral MPC controller only, etc.).

However, controlling the vehicle s600 may be otherwise performed.

In a first illustrative example of the method (e.g., example shown in FIG. 9), the method can include capturing a set of measurements of a scene surrounding a vehicle and determining a trajectory based thereon. Based on the trajectory, a set of constraints for at least one controller of a pair of controllers (e.g., a first MPC controller and a second MPC controller, etc.) can be determined. The first MPC controller is preferably the longitudinal MPC controller, and the second MPC controller is preferably the lateral MPC controller, but the first and second MPC controllers can alternatively be opposite controllers. At a first timestep, the first MPC controller can determine a first set of kinematic parameters (e.g., acceleration parameters, yaw rate parameters, yaw parameters, etc.) for the vehicle based on the trajectory and can generate a set of coupling signals (e.g., comprising kinematic parameters and/or errors thereof) for use by the second MPC controller. The second MPC controller can, based on the set of coupling signals, determine a second set of kinematic parameters and can generate a second set of coupling signals (e.g., comprising kinematic states) for use by the first MPC controller at a second timestep. At a second timestep, the kinematic parameters generation and coupling signal generation processes of the first and second MPC controllers can be repeated, where the second set of coupling signals is used by the first MPC controller to determine vehicle kinematics. Based on the determined vehicle kinematics, a set of vehicle component commands (e.g., torque, steering angle commands, etc.) can be determined and implemented at a set of vehicle components (e.g., a vehicle drive system, a vehicle steering system, etc.). In this illustrative example, the MPC controllers can optionally include converting high-level vehicle commands (e.g., acceleration, yaw, yaw rate, etc.) into vehicle component commands (e.g., commands for actuators of the vehicle, etc.).

In a second illustrative example of the method (e.g., example shown in FIG. 8), the method can include capturing a set of measurements of a set of obstacles proximal to the vehicle, and determining an environmental representation of the set of obstacles depicted within the set of measurements. Based on the set of measurements, a set of vehicle trajectories can be determined, and a set of regions in a 2D error space can be identified, where each region represents a safety-validated kinematic operating envelope for kinematic deviation of a future kinematic state from the trajectory. The 2D error space can be defined by an axis representing heading error (e.g., error of vehicle yaw/heading error deviation relative to a vehicle trajectory) and a lateral error (e.g., lateral deviation of the vehicle relative to the vehicle trajectory). Based on the set of regions, a set of constraints (e.g., CBFs) can be generated, and the drive system of the vehicle can be controlled to follow the trajectory using the set of constraints on vehicle kinematics.

The method can be performed during vehicle control (e.g., in order to facilitate dynamic vehicle commands determination, etc.). All or portions of the method can be performed in real time (e.g., responsive to a request), iteratively, concurrently, asynchronously, periodically, and/ or at any other suitable time. All or portions of the method can be performed automatically, manually, semi-automatically, and/or otherwise performed.

All or portions of the method can be performed by one or more components of the system, using a computing system, using a database (e.g., a system database, a third-party database, etc.), by a user, and/or by any other suitable system. The computing system can include one or more: CPUs, GPUs, custom FPGA/ASICS, microprocessors, servers, cloud computing, and/or any other suitable components. The computing system can be local, remote, distributed, or otherwise arranged relative to any other system or module.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system (e.g., the vehicle computing system), cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

In the figures and/or text of the present specification, the following parameters may be represented symbolically: the planning horizon can be represented as "$N_P$"; the number of error regions can be represented as "$N_C$". The heading error can be represented as "$e_\psi$". The lateral position error can be represented as "$e_y$". A current timestep can be represented as "t_current" or "k" (and values associated with a particular timestep can use a "k" subscript). The estimated current kinematic state of the vehicle (e.g., output from the localization module, etc.) can be represented as "$\hat{z}$". The steering angle can be represented as $\delta$. The reference trajectory can be represented as "$z_r$". The road inclination angle (pitch) can be represented as "$\theta$". The road banking angle (roll) can be represented as "$\varphi$". Acceleration can be represented as a "a". Error can be represented as "$e_1$" (longitudinal error) or "$e_{2,k}$" (lateral error). The coupling signals can be represented as "$z_{21}$" (from lateral to longitudinal) or "$z_{12}$". The kinematic parameters (e.g., control inputs) can be represented as "$u_1$*" (longitudinal) or "$u_2$*" or simply "u" (combined). Torque values can be represented as "$T_e$" (engine torque) or "$T_b$" (braking torque). Maximum motor torque can be represented as $T_{emax}$. Gear ratio can be represented as "$G_r$". Measured values can be represented with a bar (e.g., "$\bar{a}$"). Estimated values can be represented with an umlaut (e.g., $\ddot{z}$). Commanded values can be represented with an asterisk (e.g., $u_1$*). Rate of change can be represented with dot notation (e.g., for rate of change of steering angle, etc.). However, any other suitable parameters can be represented using symbols.

As a person skilled in the art will recognize from the previous detailed description and from the figures and claims, modifications and changes can be made to the preferred embodiments of the invention without departing from the scope of this invention defined in the following claims.

We claim:

1. A method, comprising:
capturing a set of measurements of a scene surrounding a vehicle;
based on the set of measurements, determining a trajectory for the vehicle;
based on the trajectory, determining a set of constraints for a pair of controllers, the pair of controllers comprising a lateral controller and a longitudinal controller, wherein the lateral controller and longitudinal controller determine vehicle commands in separate and distinct domains;
during a first timestep:
based on the trajectory and using a first controller of the pair of controllers, determining a first set of vehicle commands and a first set of coupling signals; and
based on the trajectory, the set of constraints, and the first set of coupling signals, and using a second controller of the pair of controllers, determining a second set of vehicle commands and a second set of coupling signals; and
during a second timestep:
based on the second set of coupling signals, and using the first controller, determining a third set of vehicle commands and a third set of coupling signals; and
based on the third set of coupling signals, using the second controller, determining a fourth set of vehicle commands;
determining a set of vehicle actuator control instructions based on the third set of vehicle commands and the fourth set of vehicle commands; and
controlling a set of actuators of the vehicle according to the set of vehicle actuator control instructions.

2. The method of claim 1, wherein the first controller is the longitudinal controller, wherein the first set of vehicle commands comprises a longitudinal kinematic parameter, and wherein the second controller is the lateral controller, wherein the second set of vehicle commands comprises an angular kinematic parameter.

3. The method of claim 2, wherein the first set of coupling signals and second set of coupling signals represent kinematic interdependencies between lateral and longitudinal vehicle dynamics.

4. The method of claim 3, wherein the first set of coupling signals comprises a longitudinal velocity of the vehicle, and the second set of coupling signals comprises a yaw rate and lateral velocity of the vehicle.

5. The method of claim 1, wherein the first and second set of vehicle commands comprise vehicle component controls.

6. The method of claim 1, wherein the set of constraints comprises a steering constraint having a $4^{th}$-order control barrier function based on a lateral position error and an orientation error, and wherein determining the second set of vehicle commands comprises using the steering constraint.

7. The method of claim 1, wherein determining the set of constraints comprises:

based on a virtual representation of a set of objects in the scene, determining a set of regions within a trajectory error space defined by:

a first axis representing a translational error relative to the trajectory; and a second axis representing a rotational error relative to the trajectory; and transforming the set of regions into the set of constraints.

8. The method of claim 7, wherein the set of regions is a time series of multiple regions.

9. The method of claim 7, wherein the set of constraints comprises control barrier functions used by a strict subset of the pair of controllers during vehicle commands determination.

10. The method of claim 7, wherein determining the set of regions comprises generating a convex approximation of a plurality of error values in the trajectory error space.

11. A method, comprising:

using a set of sensors onboard a vehicle, capturing a set of measurements of a set of objects proximal to the vehicle;

based on the set of measurements, determining a virtual representation of the set of objects;

based on the set of measurements, determining a vehicle trajectory;

based on the virtual representation of the set of objects, determining a set of regions within a trajectory error space defined by:

a first component of vehicle trajectory error; and a second component of vehicle trajectory error distinct from the first component of vehicle trajectory error, wherein a region of the set of regions defines a constraint on error in the first component of vehicle trajectory as a function of the second component of vehicle trajectory error;

based on the set of regions in trajectory error space, determining a set of constraints;

based on the trajectory and the set of constraints, using a set of controllers, determining a set of vehicle controls; and controlling a powertrain of the vehicle based on the set of vehicle controls.

12. The method of claim 11, wherein each region of the set of regions comprises a respective kinematic operating envelope for the vehicle relative to the trajectory.

13. The method of claim 12, wherein the first component of trajectory error is a lateral translational deviation from the trajectory, and the second component of trajectory error is a heading deviation from the trajectory.

14. The method of claim 11, wherein the set of regions comprises a time series of regions.

15. The method of claim 14, wherein determining the set of vehicle controls comprises using multiple distinct regions of the time series of regions.

16. The method of claim 14, wherein each region of the set of regions corresponds to a respective timestep in a control horizon.

17. The method of claim 16, wherein an object of the set of objects corresponds to the respective timestep, and detection of the respective object triggers determination of the respective region.

18. The method of claim 14, wherein a consecutive subset of regions of the time series of regions are identical.

19. The method of claim 11, wherein the set of controllers comprises:

a lateral controller determining commands for a first set of vehicle actuators; and a longitudinal controller determining control instructions for a second set of vehicle actuators distinct from the first set of vehicle actuators.

20. The method of claim 11, wherein the set of constraints applies to exactly one controller of the set of controllers, wherein the exactly one controller is the lateral controller.

\* \* \* \* \*